(12) United States Patent
Higuchi et al.

(10) Patent No.: US 10,993,158 B2
(45) Date of Patent: Apr. 27, 2021

(54) MOBILE TERMINAL APPARATUS, BASE STATION APPARATUS, COMMUNICATION SYSTEM, AND COMMUNICATION CONTROL METHOD

(71) Applicant: PANASONIC CORPORATION, Osaka (JP)

(72) Inventors: Takumi Higuchi, Kanagawa (JP); Noriyuki Shimizu, Kanagawa (JP); Maho Takita, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 16/772,533

(22) PCT Filed: Nov. 8, 2018

(86) PCT No.: PCT/JP2018/041527
§ 371 (c)(1),
(2) Date: Jun. 12, 2020

(87) PCT Pub. No.: WO2019/116794
PCT Pub. Date: Jun. 20, 2019

(65) Prior Publication Data
US 2020/0389825 A1    Dec. 10, 2020

(30) Foreign Application Priority Data

Dec. 15, 2017 (JP) .............................. JP2017-240603

(51) Int. Cl.
*H04W 36/08* (2009.01)
*H04W 36/00* (2009.01)
(Continued)

(52) U.S. Cl.
CPC ....... *H04W 36/08* (2013.01); *H04W 36/0055* (2013.01); *H04W 36/0083* (2013.01); *H04W 36/30* (2013.01); *H04W 88/08* (2013.01)

(58) Field of Classification Search
CPC ............. H04W 36/08; H04W 36/0055; H04W 36/0083; H04W 36/30; H04W 88/08
(Continued)

(56) References Cited

U.S. PATENT DOCUMENTS

2008/0020770 A1    1/2008  Hofmann
2012/0264436 A1   10/2012  Fujito

FOREIGN PATENT DOCUMENTS

JP    2001-112039     4/2001
JP    2009-544210    12/2009
(Continued)

OTHER PUBLICATIONS

English language translation of International Search Report (ISR) from International Searching Authority (Japan Patent Office) in International Pat. Appl. No. PCT/JP2018/041527, dated Jan. 29, 2019.
(Continued)

*Primary Examiner* — Joel Ajayi
(74) *Attorney, Agent, or Firm* — Greenblum & Bernstein, P.L.C.

(57) ABSTRACT

In order to prevent occurrence of the significantly frequent transmission of messages, a user terminal is configured such that, when a reception power of a target cell is equal to or greater than a first threshold value ThLOW, the user terminal starts preparation for a handover to the target cell, and when the reception power is equal to or greater than a second threshold value ThHIGH, the user terminal performs the handover to the target cell, and that, until a waiting time has elapsed after performing the handover, the user terminal, by (Continued)

using a timer, performs a timing control for maintaining an immediate handover state in which the user terminal can immediately perform a handover, and, when the waiting time has elapsed, the user terminal ends the immediate handover state.

18 Claims, 20 Drawing Sheets

(51) Int. Cl.
  *H04W 36/30* (2009.01)
  *H04W 88/08* (2009.01)
(58) Field of Classification Search
  USPC .......................................................... 455/436
  See application file for complete search history.

(56) References Cited

FOREIGN PATENT DOCUMENTS

| JP | 4642613 | 3/2011 |
| JP | 2011-135383 | 7/2011 |

OTHER PUBLICATIONS

Ericsson, "Conditional Handover", 3GPP TSG-RAN WG2 #100 R2-1713606, Dec. 1, 2017.

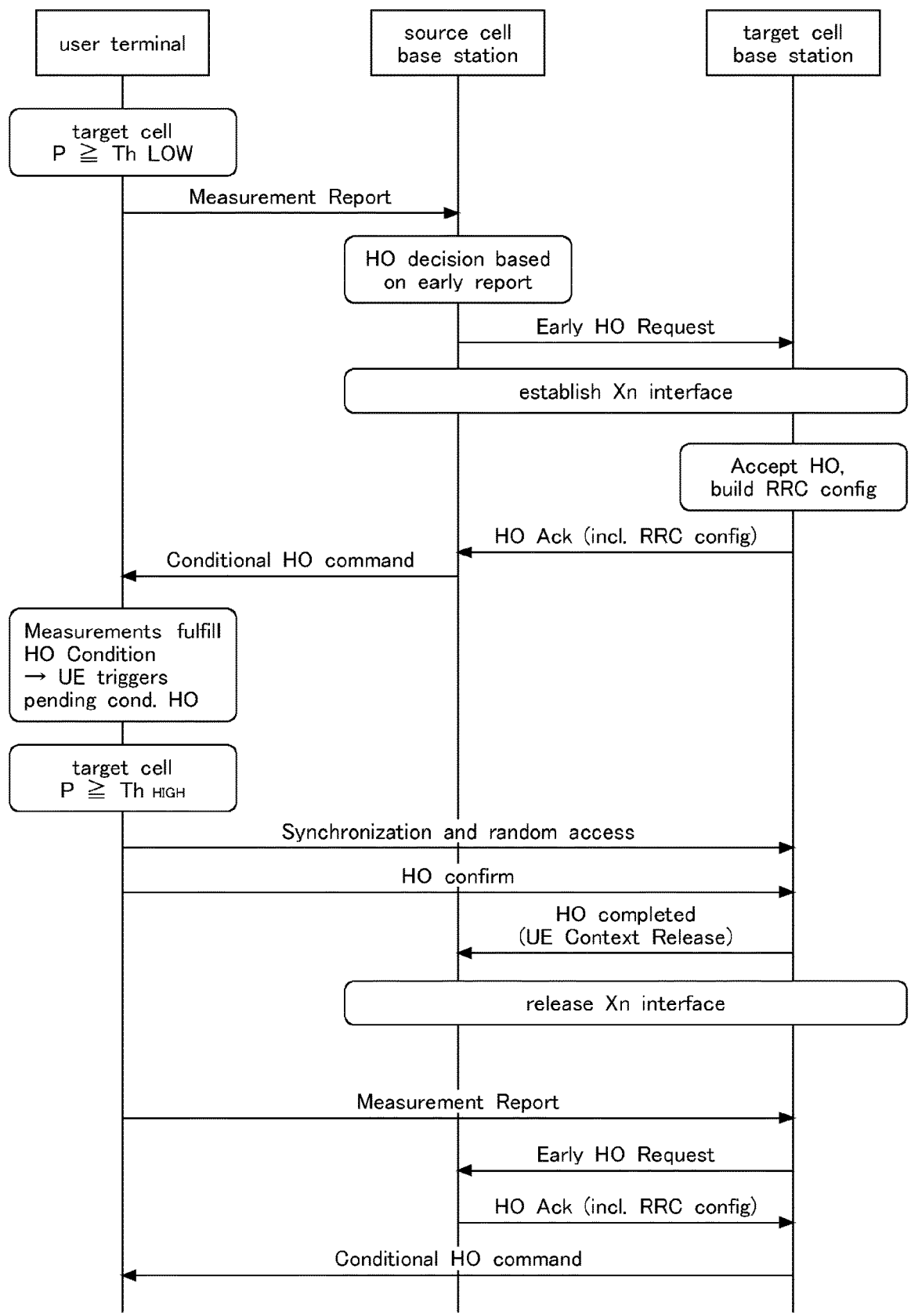

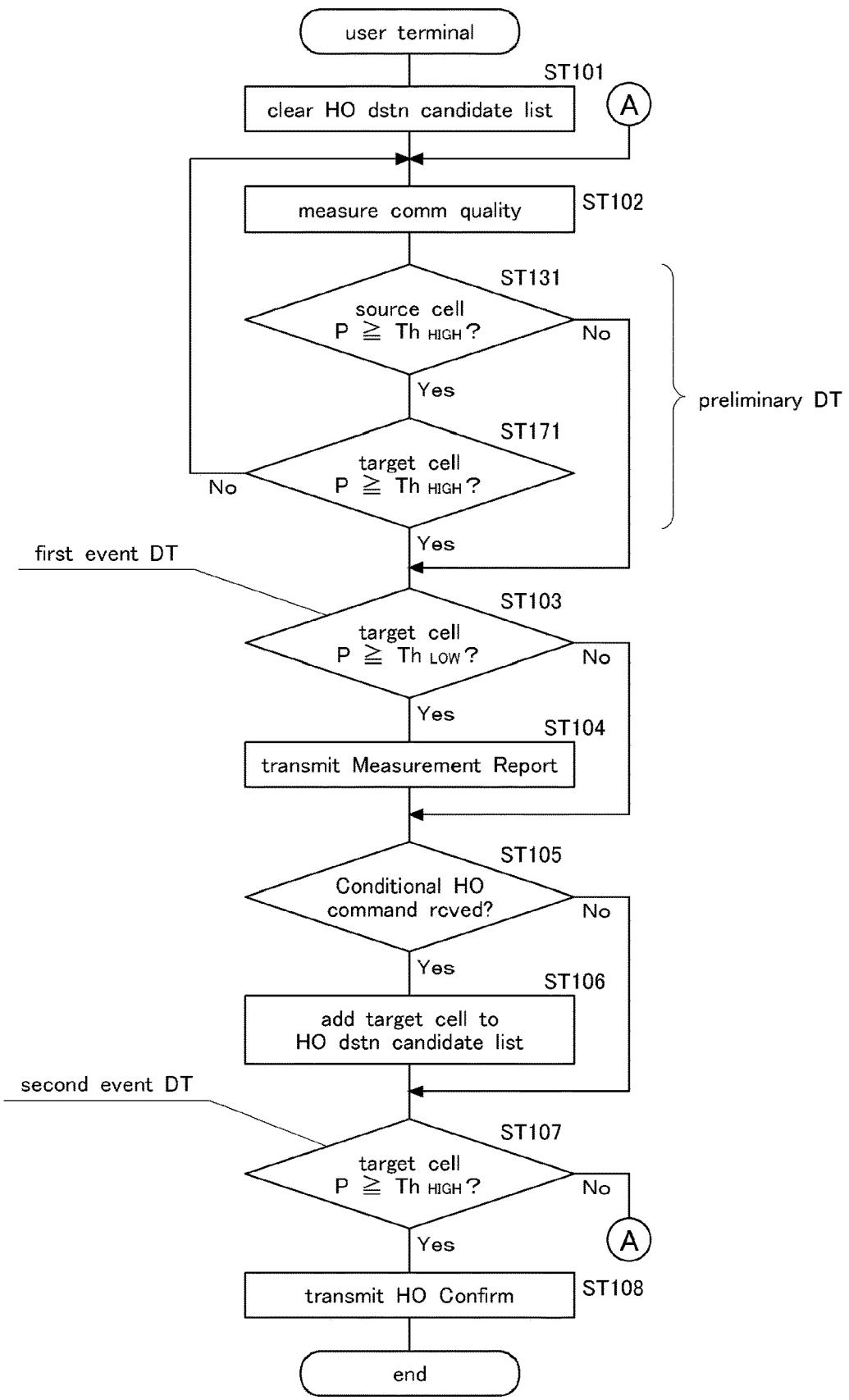

MOBILE TERMINAL APPARATUS, BASE STATION APPARATUS, COMMUNICATION SYSTEM, AND COMMUNICATION CONTROL METHOD

TECHNICAL FIELD

The present invention relates to a mobile terminal apparatus configured to perform a handover for switching a connection destination from a base station apparatus of a source cell to a base station apparatus of a target cell, a base station apparatus configured such that a mobile terminal apparatus can switch a connection destination from the base station apparatus to a different base station apparatus by performing a handover, and a communication system and a communication control method for performing a handover for switching a connection destination of a mobile terminal apparatus from a base station apparatus of a source cell to a base station apparatus of a target cell.

BACKGROUND ART

In recent years, in the technical field of land mobile communications, the fifth generation mobile communication technology standard (5G) is being formulated in order to increase communication capacity and achieve low latency communications. In such 5G systems, a new technical method called fast handover (conditional handover) has been proposed for use in a handover operation; that is, switching a communication destination of a mobile station from one base station to another.

In the fast handover technology, a mobile station sets a first threshold value which defines the time at which preparation for a handover starts, and a second threshold value which defines the time at which the mobile station performs a handover, and the mobile station is configured to start preparation for a handover when a reception power is equal to or greater than the first threshold value, and perform the handover when the reception power is equal to or greater than the second threshold value.

Known technologies include one in which, in order to avoid occurrence of intermittent communication breaks, when a user terminal performs a handover for switching its communication destination from one base station to another, the user terminal calculates a handover occurrence probability, predicts the occurrence of a handover, and prospectively starts preparation for a handover. (See Patent Document 1)

PRIOR ART DOCUMENT (S)

Patent Document(S)

Patent Document 1: JP4642613B

SUMMARY OF THE INVENTION

Task to be Accomplished by the Invention

However, the above-described prior art technology, in which a user terminal starts preparation for a handover before performing the handover becomes possible, involves a problem that, when preparing for a handover, the user terminal needs to transmit messages for reporting a communication quality measured at the user terminal to a base station, which inconveniently causes excessively frequent transmission of messages, thereby wastefully using wireless communication resources. In addition, the technology involves another problem that, in when preparing for a handover, messages needs to be transmitted between a base station as a handover source and a different base station as a handover destination, which also causes excessively frequent transmission of messages, thereby wastefully using wireless communication resources. In particular, in cases where a mobile terminal apparatus is located at or near the boundary between base station apparatuses of a source cell and a target cell, the technology involves a problem that the mobile terminal apparatus tends to perform preparation operations for handovers to the two different base station apparatuses in an alternate and repeated manner, which causes excessively frequent transmission of messages, thereby wastefully using wireless communication resources.

The present invention has been made in view of such problems of the prior art, and a primary object of the present invention is to provide a mobile terminal apparatus, a base station apparatus, and a communication system and a communication control method, which can prevent occurrence of the significantly frequent transmission of messages even when a fast handover technology is used.

Means to Accomplish the Task

An aspect of the present invention provides a mobile terminal apparatus configured to perform a handover for switching a connection destination from a base station apparatus of a source cell to a base station apparatus of a target cell, the mobile terminal apparatus comprising: a communication device configured to perform wireless communication with the base station apparatus of the source cell and the base station apparatus of the target cell; and a controller configured such that, when a measurement of communication quality of the target cell is equal to or greater than a first threshold value, the controller starts preparation for a handover to the base station apparatus of the target cell, and when the measurement is equal to or greater than a second threshold value, the controller performs the handover, wherein, until a waiting time has elapsed after performing the handover, the controller performs a timing control for maintaining an immediate handover state in which the controller can immediately perform a handover to the base station apparatus of the source cell, and wherein, when the waiting time has elapsed, the controller ends the immediate handover state and enters a normal handover state in which the controller requires preparation for a handover.

Another aspect of the present invention provides a base station apparatus configured such that a mobile terminal apparatus can switch a connection destination from the base station apparatus to a different base station apparatus by performing a handover, the mobile terminal apparatus comprising: a first communication device configured to perform wireless communication with the mobile terminal apparatus; a second communication device configured to perform wireless communication with the different base station apparatus; and a controller configured such that, when the mobile terminal apparatus performs a handover to the base station apparatus as a target cell, the controller causes an inter-base-station interface to be established between the base station apparatus and the different base station apparatus and controls the handover performed by the mobile terminal apparatus, wherein, until a waiting time has elapsed after the mobile terminal apparatus performing the handover, the controller performs a timing control for suspending the inter-base-station interface from being released, and wherein, when the waiting time has elapsed, the controller causes the inter-base-station interface to be released.

Yet another aspect of the present invention provides a communication system a communication system for performing a handover for switching a connection destination of a mobile terminal apparatus from a base station apparatus of a source cell to a base station apparatus of a target cell, wherein the mobile terminal apparatus comprises: a communication device configured to perform wireless communication with the base station apparatus of the source cell and the base station apparatus of the target cell; and a controller configured such that, when a measurement of communication quality of the target cell is equal to or greater than a first threshold value, the controller starts preparation for a handover to the base station apparatus of the target cell, and when the measurement is equal to or greater than a second threshold value, the controller performs the handover, wherein, until a waiting time has elapsed after performing the handover, the controller of the mobile terminal apparatus performs a timing control for maintaining an immediate handover state in which the controller can immediately perform a handover to the base station apparatus of the source cell, and wherein, when the waiting time has elapsed, the controller ends the immediate handover state and enters a normal handover state in which the controller requires preparation for a handover, wherein the base station apparatus of the target cell comprises: a first communication device configured to perform wireless communication with the mobile terminal apparatus; a second communication device configured to perform wireless communication with the different base station apparatus; and a controller configured such that, when the mobile terminal apparatus performs a handover to the base station apparatus as the target cell, the controller causes an inter-base-station interface to be established between the base station apparatus and the different base station apparatus as the source cell and controls the handover performed by the mobile terminal apparatus, wherein, until a waiting time has elapsed after the mobile terminal apparatus performing the handover, the controller of the base station apparatus of the target cell performs a timing control for suspending the inter-base-station interface from being released, and wherein, when the waiting time has elapsed, the controller causes the inter-base-station interface released.

Yet another aspect of the present invention provides a communication control method for performing a handover for switching a connection destination of a mobile terminal apparatus from a base station apparatus of a source cell to one in a base station apparatus of a target cell, wherein the mobile terminal apparatus performs a fast handover control in which, when a measurement of communication quality of the target cell is equal to or greater than a first threshold value, the mobile terminal apparatus starts preparation for a handover to the target cell, and when the measurement is equal to or greater than a second threshold value, the mobile terminal apparatus performs the handover to the target cell, wherein, until a waiting time has elapsed after performing the handover to the target cell, the mobile terminal apparatus performs a timing control for maintaining an immediate handover state in which the mobile terminal apparatus can immediately perform a handover to the base station apparatus of the source cell, and wherein, when the waiting time has elapsed, the mobile terminal apparatus ends the immediate handover state and enters a normal handover state in which the mobile terminal apparatus requires preparation for a handover, wherein, when the mobile terminal apparatus performs the handover, the base station apparatus of the target cell causes an inter-base-station interface to be established between the base station apparatus and the different base station apparatus of the source cell and controls the handover performed by the mobile terminal apparatus, wherein, until a waiting time has elapsed after the mobile terminal apparatus performing the handover, the base station apparatus of the target cell performs a timing control for suspending the inter-base-station interface from being released, and wherein, when the waiting time has elapsed, the base station apparatus of the target cell causes the inter-base-station interface to be released.

Effect of the Invention

According to the present invention, it is possible to prevent occurrence of the significantly frequent transmission of messages even when a fast handover technology is used. Thus, the prevent invention enables efficient use of wireless communication resources between a mobile terminal apparatus and a base station apparatus, and enables efficient use of inter-base-station communication resources.

BRIEF DESCRIPTION OF THE DRAWINGS

FIG. 3 is a sequence diagram showing a basic operation procedure of a communication system adopting the fast handover technology;

FIG. 20 is a flow chart showing an operation procedure of the user terminal 1 according to a fourth variation of the third embodiment of the present invention.

DESCRIPTION OF THE PREFERRED EMBODIMENT(S)

Figure 1:
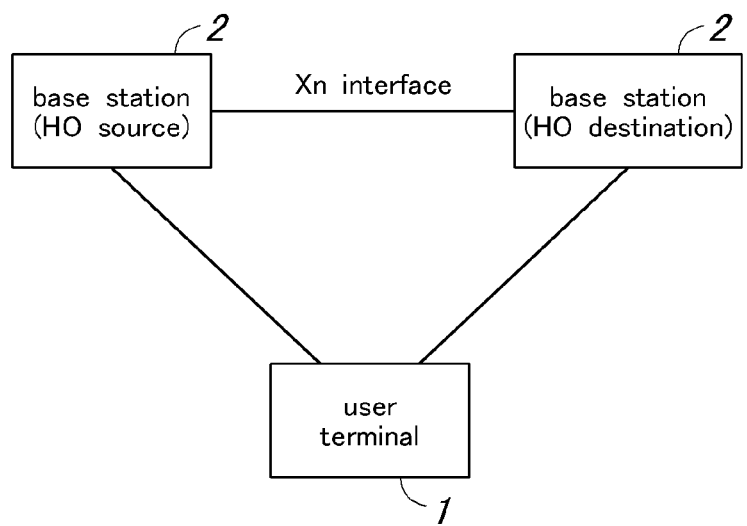
FIG. 1 is a diagram showing a general configuration of a communication system according to a first embodiment of the present invention.

A first aspect of the present invention made to achieve the above-described object is a mobile terminal apparatus configured to perform a handover for switching a connection destination from a base station apparatus of a source cell to a base station apparatus of a target cell, the mobile terminal apparatus comprising: a communication device configured to perform wireless communication with the base station apparatus of the source cell and the base station apparatus of the target cell; and a controller configured such that, when a measurement of communication quality of the target cell is equal to or greater than a first threshold value, the controller starts preparation for a handover to the base station apparatus of the target cell, and when the measurement is equal to or greater than a second threshold value, the controller performs the handover, wherein, until a waiting time has elapsed after performing the handover, the controller performs a timing control for maintaining an immediate handover state in which the controller can immediately perform a handover to the base station apparatus of the source cell, and wherein, when the waiting time has elapsed, the controller ends the immediate handover state and enters a normal handover state in which the controller requires preparation for a handover.

In this configuration, until a waiting time has elapsed after performing a handover to the base station apparatus of the target cell, if a mobile terminal apparatus moves back to the source cell, the mobile terminal apparatus is allowed to immediately perform a handover back to the base station apparatus of the source cell without preparation therefor. Thus, it is possible to reduce the frequency of transmission of measurement report messages from the mobile terminal apparatus. This enables efficient use of wireless communication resources between a mobile terminal apparatus and a base station apparatus.

A second aspect of the present invention is the mobile terminal apparatus of the first aspect, wherein the controller performs the timing control based on the waiting time, wherein the waiting time is preset.

This configuration enables the mobile terminal apparatus to easily perform the timing control.

A third aspect of the present invention is the mobile terminal apparatus of the first aspect, wherein the controller performs the timing control based on the waiting time, wherein the waiting time is determined based on at least one of a moving speed of the mobile terminal apparatus, a moving direction of the mobile terminal apparatus, and a cell radius of the source cell.

This configuration enables the mobile terminal apparatus to properly perform the timing control.

A fourth aspect of the present invention is a mobile terminal apparatus configured to perform a handover for switching a connection destination from a base station apparatus of a source cell to a base station apparatus of a target cell, the mobile terminal apparatus comprising: a communication device configured to perform wireless communication with the base station apparatus of the source cell and the base station apparatus of the target cell; and a controller configured such that, when a measurement of communication quality of the target cell is equal to or greater than a first threshold value, the controller starts preparation for a handover to the base station apparatus the target cell, and when the measurement is equal to or greater than a second threshold value, the controller performs the handover, wherein, until a prescribed event regarding communication quality of the source cell occurs after performing the handover, the controller performs a timing control for maintaining an immediate handover state in which the controller can immediately perform a handover to the base station apparatus of the source cell, and wherein, when the prescribed event occurs, the controller ends the immediate handover state, enters a normal handover state in which the controller requires preparation for a handover, and transmits a message from the communication device to the base station apparatus of the target cell to which the mobile terminal apparatus is currently connected, the message instructing to release an inter-base-station interface.

In this configuration, until a waiting time has elapsed after performing a handover to the base station apparatus of the target cell, if a mobile terminal apparatus moves back to the source cell, the mobile terminal apparatus is allowed to immediately perform a handover back to the base station apparatus of the source cell without preparation therefor. Thus, it is possible to reduce the frequency of transmission of measurement report messages from the mobile terminal apparatus. This enables efficient use of wireless communication resources between a mobile terminal apparatus and a base station apparatus.

A fifth aspect of the present invention is the mobile terminal apparatus of the fourth aspect, wherein the controller determines that the prescribed event has occurred when the measurement of communication quality of the source cell is equal to or less than a third threshold value.

This configuration enables the immediate handover state to be released at a proper time.

A sixth aspect of the present invention is the mobile terminal apparatus of the fifth aspect, wherein the controller determines whether or not the prescribed event has occurred based on the third threshold value, wherein the third threshold value is less than the first threshold value.

This configuration enables the immediate handover state to be released at a proper time.

A seventh aspect of the present invention is the mobile terminal apparatus of the fourth aspect, wherein the controller determines that the prescribed event has occurred when the mobile terminal apparatus becomes unable to receive a radio wave from the source cell.

This configuration enables the immediate handover state to be released at a proper time.

An eighth aspect of the present invention is the mobile terminal apparatus of the first or fourth aspect, wherein, if the target cell has a lower priority than or same priority as the source cell, the controller performs the timing control, and if the target cell has a higher priority than the source cell, the controller does not perform the timing control.

In this configuration, when the target cell has lower priority than the source cell, the mobile terminal apparatus has a higher probability of occurrence of a back handover to change the communication destination to the target cell, and thus the mobile terminal apparatus can perform the timing control to thereby reduce the frequency of transmission of messages.

A ninth aspect of the present invention is a mobile terminal apparatus configured to perform a handover for switching a connection destination from a base station apparatus of a source cell to a base station apparatus of a target cell, the mobile terminal apparatus comprising: a communication device configured to perform wireless communication with the base station apparatus of the source cell and the base station apparatus of the target cell; and a controller configured such that, when a measurement of communication quality of the target cell is equal to or greater than a first threshold value, the controller can start preparation for a handover to the base station apparatus of the target cell, and when the measurement is equal to or greater than a second threshold value, the controller performs the handover, wherein the controller is configured to perform a preliminary determination operation on whether or not a measurement of communication quality of the source cell is equal to or greater than the second threshold value, and wherein, if the measurement of communication quality of the source cell is equal to or greater than the second threshold value, even when the measurement of communication quality of the target cell is equal to or greater than the first threshold value, the controller does not start preparation for the handover to the base station apparatus of the target cell.

In this configuration, even when communication quality of the target cell is greater than a prescribed level, if the communication quality of the source cell is good, the mobile terminal apparatus does not start preparation for a handover to the target cell. This enables efficient use of wireless communication resources between a mobile terminal apparatus and a base station apparatus.

A tenth aspect of the present invention is the mobile terminal apparatus of the ninth aspect, wherein, if the source cell has a higher priority than the target cell, the controller performs the timing control, and if the source cell has a lower priority than or same priority as the target cell, the controller does not perform the preliminary determination operation.

This configuration enables efficient use of inter-base-station interface resources depending on the priorities of cells.

An eleventh aspect of the present invention is the mobile terminal apparatus of the ninth aspect, wherein, if the source cell does not use a high frequency band radio access technology, the controller performs the preliminary determination operation, otherwise the controller does not perform the preliminary determination operation.

This configuration enables a mobile terminal apparatus to smoothly perform a handover even under a high frequency environment in which intermittent communication breaks are likely to occur due to obstacles.

A twelfth aspect of the present invention is the mobile terminal apparatus of the ninth aspect, wherein, if the mobile terminal apparatus travels at a speed lower than a predetermined speed, the controller performs the preliminary determination operation, otherwise the controller does not perform the preliminary determination operation.

This configuration can prevent a mobile terminal apparatus moving at a high speed from failing to perform a necessary handover, thereby enabling the mobile terminal apparatus to smoothly perform a handover to the target cell.

A thirteenth aspect of the present invention is the mobile terminal apparatus of the ninth aspect, wherein, even when the measurement of communication quality of the source cell is greater than the second threshold value, if the measurement of communication quality of the target cell is equal to or greater than the second threshold value, the controller can start preparation for the handover to the base station apparatus of the target cell.

This configuration enables a mobile terminal apparatus to perform a handover in a quick manner depending on the transmission states.

A fourteenth aspect of the present invention is a base station apparatus configured such that a mobile terminal apparatus can switch a connection destination from the base station apparatus to a different base station apparatus by performing a handover, the mobile terminal apparatus comprising: a first communication device configured to perform wireless communication with the mobile terminal apparatus; a second communication device configured to perform wireless communication with the different base station apparatus; and a controller configured such that, when the mobile terminal apparatus performs a handover to the base station apparatus as a target cell, the controller causes an inter-base-station interface to be established between the base station apparatus and the different base station apparatus and controls the handover performed by the mobile terminal apparatus, wherein, until a waiting time has elapsed after the mobile terminal apparatus performing the handover, the controller performs a timing control for suspending the inter-base-station interface from being released, and wherein, when the waiting time has elapsed, the controller causes the inter-base-station interface to be released.

In this configuration, until a waiting time has elapsed after a mobile terminal apparatus performing a handover to the target cell, a base station apparatus can maintain an inter-base-station interface. Thus, since this configuration eliminates a need for the base station apparatus to transmit a message for establishment of the inter-base-station interface even when a handover back to the source cell occurs during the waiting time after performing the handover, it is possible to reduce the frequency of transmission of messages via the inter-base-station interface. This enables efficient use of inter-base-station communication resources.

A fifteenth aspect of the present invention is a base station apparatus configured such that a mobile terminal apparatus can switch a connection destination from the base station apparatus to a different base station apparatus by performing a handover, the mobile terminal apparatus comprising: a first communication device configured to perform wireless communication with the mobile terminal apparatus; a second communication device configured to perform wireless communication with the different base station apparatus; and a controller configured such that, when the mobile terminal apparatus performs a handover to the base station apparatus as a target cell, the controller causes an inter-base-station interface to be established between the base station apparatus and the different base station apparatus as a source cell and controls the handover performed by the mobile terminal apparatus, wherein, until a prescribed event regarding communication quality of the source cell occurs after the mobile terminal apparatus performing the handover, the controller performs a timing control for suspending the inter-base-station interface from being released, and wherein, when the first communication device receives a message instructing to release the inter-base-station interface, the controller causes the inter-base-station interface to be released.

In this configuration, until a waiting time has elapsed after a mobile terminal apparatus performing a handover to the target cell, a base station apparatus can maintain an inter-base-station interface. Thus, since this configuration eliminates a need for the base station apparatus to transmit a message for establishment of the inter-base-station interface even when a handover back to the source cell occurs during the time period from the handover to the occurrence of the prescribed event, it is possible to reduce the frequency of transmission of messages via the inter-base-station interface. This enables efficient use of inter-base-station communication resources.

A sixteenth aspect of the present invention is the base station apparatus of the fourteenth or fifteenth aspect, wherein, immediately after the mobile terminal apparatus performing the handover, the controller transmits a message from the second communication to the different base station apparatus of the source cell, the message instructing the different base station apparatus to stop performing a processing operation regarding a wireless communication control.

In this configuration, immediately after a mobile terminal apparatus performing the handover, a base station apparatus transmits a message to the different base station apparatus of the source cell in order to instruct the different base station apparatus to stop performing a processing operation regarding control of wireless communication. This can prevent the base station apparatus of the source cell from continuing to transmit unnecessary messages to the mobile terminal apparatus after the handover.

A seventeenth aspect of the present invention is a communication system for performing a handover for switching a connection destination of a mobile terminal apparatus from a base station apparatus of a source cell to a base station apparatus of a target cell, wherein the mobile terminal apparatus comprises: a communication device configured to perform wireless communication with the base station apparatus of the source cell and the base station apparatus of the target cell; and a controller configured such that, when a measurement of communication quality of the target cell is equal to or greater than a first threshold value, the controller starts preparation for a handover to the base station apparatus of the target cell, and when the measurement is equal to or greater than a second threshold value, the controller performs the handover, wherein, until a waiting time has elapsed after performing the handover, the controller of the mobile terminal apparatus performs a timing control for maintaining an immediate handover state in which the controller can immediately perform a handover to the base station apparatus of the source cell, and wherein, when the waiting time has elapsed, the controller ends the immediate handover state and enters a normal handover state in which the controller requires preparation for a handover, wherein the base station apparatus of the target cell comprises: a first communication device configured to perform wireless communication with the mobile terminal apparatus; a second communication device configured to perform wireless communication with the different base station apparatus; and a controller configured such that, when the mobile terminal apparatus performs a handover to the base station apparatus as the target cell, the controller causes an inter-base-station interface to be established between the base station apparatus and the different base station apparatus as the source cell and controls the handover performed by the mobile terminal apparatus, wherein, until a waiting time has elapsed after the mobile terminal apparatus performing the handover, the controller of the base station apparatus of the target cell performs a timing control for suspending the inter-base-station interface from being released, and wherein, when the waiting time has elapsed, the controller causes the inter-base-station interface released.

In this configuration, it is possible to prevent occurrence of the significantly frequent transmission of messages even when a fast handover technology is used in the same manner as the first and fourteenth aspects of the present invention.

An eighteenth aspect of the present invention is a communication system for performing a handover for switching a connection destination of a mobile terminal apparatus from a base station apparatus of a source cell to a base station apparatus of a target cell, the mobile terminal apparatus comprising: wherein the mobile terminal apparatus comprises: a communication device configured to perform wireless communication with the base station apparatus of the source cell and the base station apparatus of the target cell; and a controller configured such that, when a measurement of communication quality of the target cell is equal to or greater than a first threshold value, the controller starts preparation for a handover to the base station apparatus of the target cell, and when the measurement is equal to or greater than a second threshold value, the controller performs the handover, wherein, until a prescribed event regarding communication quality of the source cell occurs after performing the handover, the controller of the mobile terminal apparatus performs a timing control for maintaining an immediate handover state in which the controller can immediately perform a handover to the base station apparatus of the source cell, and wherein, when the prescribed event occurs, the controller ends the immediate handover state, enters a normal handover state in which the controller requires preparation for a handover, and transmits a message from the communication device to the base station apparatus of the target cell to which the mobile terminal apparatus is currently connected, the message instructing to release an inter-base-station interface, wherein the base station apparatus of the target cell comprises: a first communication device configured to perform wireless communication with the mobile terminal apparatus; a second communication device configured to perform wireless communication with the different base station apparatus of the source cell; and a controller configured such that, when the mobile terminal apparatus performs a handover to the base station apparatus as the target cell, the controller causes an inter-base-station interface to be established between the base station apparatus and the different base station apparatus as the source cell and controls the handover performed by the mobile terminal apparatus, wherein, until a prescribed event regarding communication quality of the source cell occurs after performing the handover, the controller of the mobile terminal apparatus of the target cell performs the controller of the base station apparatus of the target cell performs a timing control for suspending the inter-base-station interface from being released, and wherein, when the first communication device receives a message from the mobile station apparatus, the message instructing to release the inter-base-station interface, the controller causes the inter-base-station interface to be released.

In this configuration, it is possible to prevent occurrence of the significantly frequent transmission of messages even when a fast handover technology is used in the same manner as the fourth and fifteenth aspects of the present invention.

A nineteenth aspect of the present invention is a communication system for performing a handover for switching a connection destination of a mobile terminal apparatus from a base station apparatus of a source cell to a base station apparatus of a target cell, the mobile terminal apparatus comprising: wherein the mobile terminal apparatus comprises: a communication device configured to perform wireless communication with the base station apparatus of the source cell and the base station apparatus of the target cell; and a controller configured such that, when a measurement of communication quality of the target cell is equal to or greater than a first threshold value, the controller starts preparation for a handover to the base station apparatus of the target cell, and when the measurement is equal to or greater than a second threshold value, the controller performs the handover, wherein the controller is configured to perform a preliminary determination operation on whether or not a measurement of communication quality of the source cell is equal to or greater than the second threshold value, and wherein, if the measurement of communication quality of the source cell is equal to or greater than the second threshold value, even when the measurement of communication quality of the target cell is equal to or greater than the first threshold value, the controller does not start preparation for a handover to the base station apparatus of the target cell.

In this configuration, it is possible to prevent occurrence of the significantly frequent transmission of messages even when a fast handover technology is used in the same manner as the sixth aspect of the present invention.

A twentieth aspect of the present invention is a communication control method for performing a handover for switching a connection destination of a mobile terminal apparatus from a base station apparatus of a source cell to one in a base station apparatus of a target cell, wherein the mobile terminal apparatus performs a fast handover control in which, when a measurement of communication quality of the target cell is equal to or greater than a first threshold value, the mobile terminal apparatus starts preparation for a handover to the target cell, and when the measurement is equal to or greater than a second threshold value, the mobile terminal apparatus performs the handover to the target cell, wherein, until a waiting time has elapsed after performing the handover to the target cell, the mobile terminal apparatus performs a timing control for maintaining an immediate handover state in which the mobile terminal apparatus can immediately perform a handover to the base station apparatus of the source cell, and wherein, when the waiting time has elapsed, the mobile terminal apparatus ends the immediate handover state and enters a normal handover state in which the mobile terminal apparatus requires preparation for a handover, wherein, when the mobile terminal apparatus performs the handover, the base station apparatus of the target cell causes an inter-base-station interface to be established between the base station apparatus and the different base station apparatus of the source cell and controls the handover performed by the mobile terminal apparatus, wherein, until a waiting time has elapsed after the mobile terminal apparatus performing the handover, the base station apparatus of the target cell performs a timing control for suspending the inter-base-station interface from being released, and wherein, when the waiting time has elapsed, the base station apparatus of the target cell causes the inter-base-station interface to be released.

In this configuration, it is possible to prevent occurrence of the significantly frequent transmission of messages even when a fast handover technology is used in the same manner as the first and fourteenth aspects of the present invention.

A twenty first aspect of the present invention is a communication control method for performing a handover for switching a connection destination of a mobile terminal apparatus from a base station apparatus of a source cell to one in a base station apparatus of a target cell, wherein the mobile terminal apparatus performs a fast handover control in which, when a measurement of communication quality of the target cell is equal to or greater than a first threshold value, the mobile terminal apparatus starts preparation for a handover to the target cell, and when the measurement is equal to or greater than a second threshold value, the mobile terminal apparatus performs the handover to the target cell, wherein, until a prescribed event regarding communication quality of the source cell occurs after performing the handover to the target cell, t the mobile terminal apparatus performs a timing control for maintaining an immediate handover state in which the mobile terminal apparatus can immediately perform a handover to the base station apparatus of the source cell, and wherein, when the prescribed event occurs, the mobile terminal apparatus ends the immediate handover state, enters a normal handover state in which the mobile terminal apparatus requires preparation for a handover, and transmits a message from the communication device to the base station apparatus of the target cell to which the mobile terminal apparatus is currently connected, the message instructing to release an inter-base-station interface, wherein, when the mobile terminal apparatus performs the handover, the base station apparatus of the target cell causes an inter-base-station interface to be established between the base station apparatus and the different base station apparatus of the source cell and controls the handover performed by the mobile terminal apparatus, wherein, until the prescribed event occurs after the mobile terminal apparatus performing the handover, the base station apparatus of the target cell performs a timing control for suspending the inter-base-station interface from being released, and wherein, when receiving a message from the mobile terminal apparatus, the message instructing to release the inter-base-station interface, the base station apparatus of the target cell causes the inter-base-station interface to be released.

In this configuration, it is possible to prevent occurrence of the significantly frequent transmission of messages even when a fast handover technology is used in the same manner as the fourth and fifteenth aspects of the present invention.

A twenty second aspect of the present invention is a communication control method for performing a handover for switching a connection destination of a mobile terminal apparatus from a base station apparatus of a source cell to one in a base station apparatus of a target cell, wherein the mobile terminal apparatus performs a fast handover control in which, when a measurement of communication quality of the target cell is equal to or greater than a first threshold value, the mobile terminal apparatus can start preparation for a handover to the target cell, and when the measurement is equal to or greater than a second threshold value, the mobile terminal apparatus performs the handover to the target cell, and wherein, when performing the fast handover, the mobile terminal apparatus performs a preliminary determination operation on whether or not a measurement of communication quality of the source cell is equal to or greater than the second threshold value, and wherein, if the measurement of communication quality of the source cell is equal to or greater than the second threshold value, even when the measurement of communication quality of the target cell is equal to or greater than the first threshold value, the mobile terminal apparatus does not start preparation for a handover to the base station apparatus of the target cell.

In this configuration, it is possible to prevent occurrence of the significantly frequent transmission of messages even when a fast handover technology is used in the same manner as the sixth aspect of the present invention.

Embodiments of the present invention will be described below with reference to the drawings.

First Embodiment

FIG. 1 is a diagram showing a general configuration of a communication system according to a first embodiment of the present invention.

The communication system includes a user terminal 1 (mobile terminal apparatus), a base station 2 (base station apparatus) of a source cell used as a handover source (hereafter also referred to as "source cell base station"), and a base station 2 (base station apparatus) of a target cell used as a handover destination (hereafter also referred to as "target cell base station").

Ae base station 2 performs wireless communication with the user terminal 1 using a radio access technology for the 5G network using a high SHF band or an EHF band (millimeter wave band), which implements a 5G NR (New Radio) technology.

An Xn interface for communicating control information messages is established between the source cell base station 2 and the target cell base station 2 so that a handover can be smoothly performed. The Xn interface allows, for example, the source cell base station 2 to notify the target cell base station 2 of sequence numbers of transmitted packets or other control information.

The Xn interface is an inter-base-station interface which can serve as a logical transmission path between the source cell base station 2 and the target cell base station 2 in the 5G network. In the present embodiment, the inter-base-station interface is referred to as an Xn interface because a base station 2 is primarily described as a 5G NR. However, a base station 2 may be one using an LTE (Long Term Evolution), and in this case, the inter-base-station interface is called an X2 interface.

Next, the fast handover technology will be described. FIG. 2 is an explanatory diagram showing some situations of a communication system adopting the fast handover technology.

In the present embodiment, the fast handover (Conditional HO) is performed. In the fast handover, the user terminal 1 starts preparation for a handover to a neighboring cell when the reception power of the neighboring cell becomes equal to or greater than a first threshold value ThLOW, and transmits a measurement report message (Measurement Report) to the base station 2 of the currently-connected cell (source cell base station). The base station 2 of the currently-connected cell (source cell base station) communicates with the base station 2 of the handover destination (target cell base station) via an Xn interface, e.g. transmits a message such as a handover request message (handover request) via the Xn interface to the target cell base station 2 so that the user terminal can immediately perform a handover. In this way, the Xn interface is established between the base stations, whereby preparation for a handover has been completed. Then, when the reception power of the cell for which preparation of a handover has been completed becomes equal to or greater than a second threshold value ThHIGH, the user terminal 1 performs the handover.

Figure 2A:
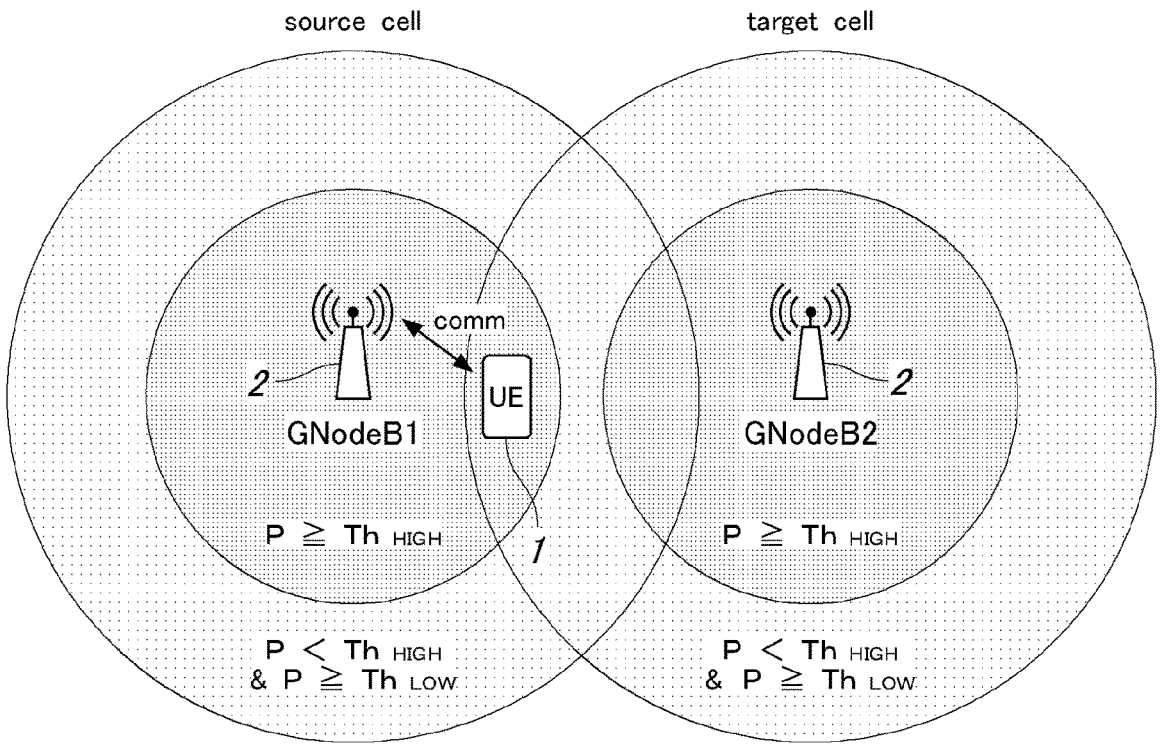
FIG. 2A and FIG. 2B are explanatory diagrams showing some situations of a communication system adopting the fast handover technology.
Figure 2B:
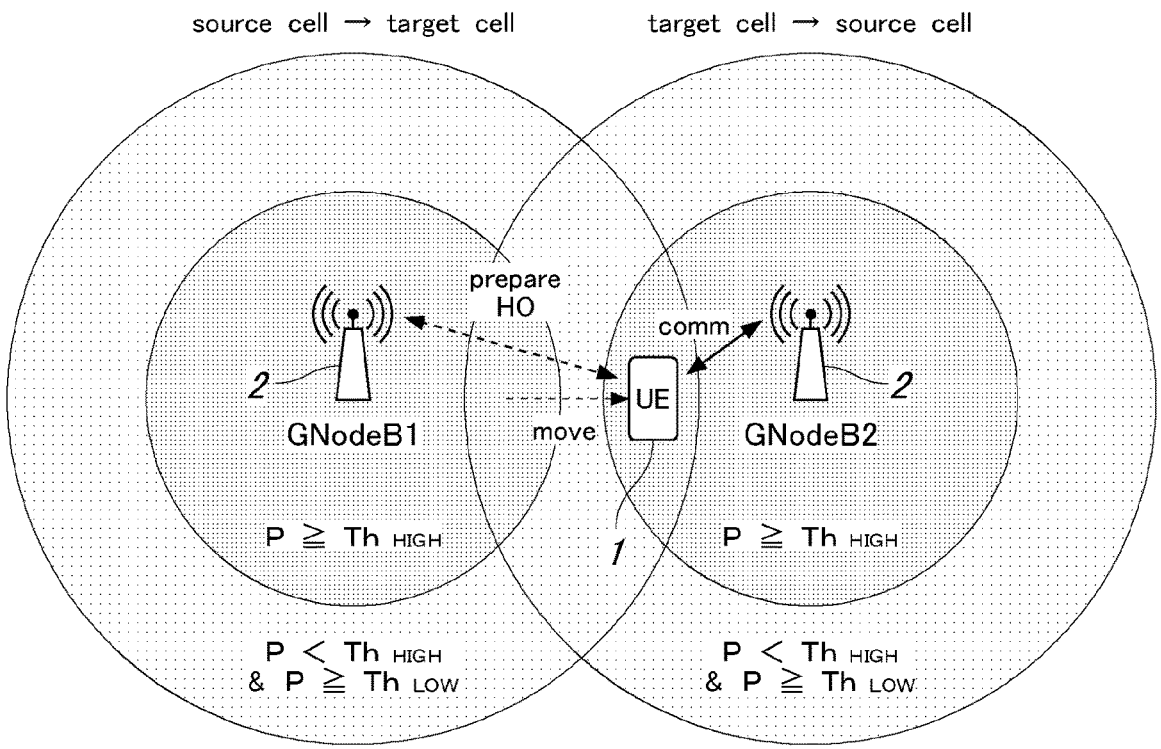

In the examples shown in FIG. 2, as shown in FIG. 2A, when the user terminal 1 is in the source cell (the cell of handover source) served by the base station 2 (GNodeB1) and also in an area where the reception power P is equal to or greater than the second threshold value ThHIGH, the user terminal 1 communicates with the base station 2 (GNodeB1). Next, as shown in FIG. 2B, when the user terminal 1 moves into the target cell (the cell of a handover destination) served by the base station 2 (GNodeB2) to be in an area where the reception power P is equal to or greater than the second threshold value ThHIGH, the user terminal 1 performs a handover, and communicates with base station 2 (GNodeB2).

When the fast handover technology is used, immediately after performing the handover, if the user terminal 1 is located within the source cell as a handover source and also is in an area where the reception power is equal to or greater than the first threshold value ThLOW and is lower than the second threshold value ThHIGH, the user terminal 1 starts preparation for a handover back to the source cell, (i.e., a handover to the original source cell as a target cell). In order to do this, the user terminal 1 transmits a measurement report message (Measurement Report), and the both base stations 2 communicate with each other, e.g. transmit messages such as a handover request message (handover request) to each other via the Xn interface. As a result, the transmission of the messages wastefully uses wireless communication and inter-base-station communication resources.

In view of this problem, in the present embodiment of the present invention, until a prescribed waiting time has elapsed after performing a handover from the base station 2 (GNodeB1) to the base station 2 (GNodeB2), the user terminal 1 maintains a state in which the user terminal 1 is prepared for a handover (immediate handover state). The user terminal 1 performs a timing control for maintaining the immediate handover state so as to prevent the user terminal 1 from, immediately after the handover, starting unnecessary preparation for another handover back to the source cell base station 2 (GNodeB1). Specifically, the user terminal 1 is prevented from transmitting a measurement report message (Measurement Report) to the base station 2 (GNodeB2) even when the reception power of the base station 2 (GNodeB1) is equal to or greater than the first threshold value ThLOW.

Moreover, in the present embodiment, until a prescribed waiting time has elapsed after performing the handover, the user terminal 1 performs a timing control on the target cell base station 2 (GNodeB2) for suspending the release (cancellation) of the Xn interface, so as to prevent the target cell base station 2 (GNodeB2) from transmitting unnecessary messages for handover preparation to the source cell base station 2 (GnodeB1).

Next, a basic operation procedure of a communication system adopting the fast handover technology will be described. FIG. 3 is a sequence diagram showing a basic operation procedure of a communication system adopting the fast handover technology.

The user terminal 1 measures the communication quality of a neighboring cell and uses the first threshold value ThLOW to perform a first event determination operation; that is, determine whether or not it is time to start preparation for a handover. Specifically, if the reception power of the neighboring cell (target cell) is equal to or greater than the first threshold value ThLOW, the user terminal 1 starts preparation for a handover and transmits a measurement report message (Measurement Report) to the currently-connected source cell base station 2.

Upon receiving the measurement report message (Measurement Report) from the user terminal 1, the source cell base station 2 performs a handover decision operation based on the measurement report (HO decision based on early report). Then, the source cell base station 2 transmits a handover request message (Early HO Request) to the target cell base station so as to cause the establishment of an Xn interface between the source cell base station 2 and the target cell base station 2.

Upon receiving the handover request message (Early HO Request) from the source cell base station 2, the target cell base station 2 performs a handover acceptance (Accept HO) and builds a RRC (Radio Resource Control) configuration (build RRC config). Then, the target cell base station 2 transmits a handover response message (HO Ack) including an information record of the RRC configuration (RRC config) to the source cell base station 2.

Upon receiving the handover response message (HO Ack) from the target cell base station 2, the source cell base station 2 transmits a handover command message (Conditional HO command) to the user terminal 1.

Upon receiving s the handover command message (Conditional HO command) from the source cell base station 2, the user terminal 1 uses the second threshold value ThHIGH to perform a second event determination operation; that is, determine whether it is a time to perform a handover. If the reception power of the target cell is equal to or greater than the second threshold value ThHIGH, the user terminal 1 performs the handover and transmits a synchronization and random access message (Synchronization and random access) to the target cell base station 2. Also, the user terminal 1 transmits a handover confirmation message (HO confirm) to the target cell base station 2.

Upon receiving the handover confirmation message (HO confirm) from the user terminal 1, the target cell base station 2 transmits a handover complete message (HO completed), which also serves as a terminal context release message (UE Context Release), to the source cell base station 2 to thereby cause the release (cancellation) of the Xn interface.

In this way, if the Xn interface is released immediately after the handover, the user terminal 1 subsequently starts preparation for a handover from the target cell base station (source cell base station after the handover) back to the source cell base station (HCELL base station after the handover), resulting in that the user terminal 1, the source cell base station 2, and the target cell base station 2 communicate with each other; that is, transmit messages relating to the preparation for the back handover to each other, which means that transmission of unnecessary messages wastefully uses wireless communication and inter-base-station communication resources.

Specifically, the user terminal 1 transmits a measurement report message (Measurement Report) regarding the source cell to the target cell base station 2; in response, the target cell base station 2 transmits a handover request message (Early HO Request) to the source cell base station 2; in response, the source cell base station 2 transmits a handover response message (HO Ack) including an information record of RRC configuration (RRC config) to the source cell base station 2; and, in response, the target cell base station 2 transmits a handover command message (Conditional HO command) to the user terminal 1. As a result, the transmission of these messages wastefully uses wireless communication and inter-base-station communication resources.

In this view, in the present embodiment, a user terminal 1 is configured to include a timer 19 (see FIG. 5) which controls the time for maintaining a state in which the user terminal can immediately perform a handover (immediate handover state), and a base station 2 is configured to include a timer 26 (see FIG. 5) which controls the time for the release of the Xn interface, and when the handover is performed, both the timers 19 and 26 start in the user terminal 1 and the base station 2, respectively.

In addition, even when an Xn interface is not maintained and a measurement report message (Measurement Report) is not transmitted by the user terminal 1, the user terminal 1 can store a handover destination candidate list in a storage, the handover destination candidate list including a list of cells to which the user terminal 1 can immediately perform a handover (cells to which the user terminal 1 is in the immediate handover state), and when the timer 19 expires, the user terminal 1 deletes the source cell (which has been a source of the handover) from the handover destination candidate list, and when the timer 26 expires, the base station 2 causes the release of the Xn interface between the base station 2 and the source cell (which has been a target of the handover).

As a result, the user terminal 1 maintains the source cell in the handover destination candidate list until the timer 19 expires, and excludes the source cell from possible targets of the first event determination operation. Thus, even if the reception power of the source cell (the target cell after the handover) is equal to or greater than the first threshold value ThLOW, the user terminal 1 is prevented from starting preparation for a handover back to the source cell, and from transmitting a measurement report message (Measurement Report) therefrom. Also, even if the handover is performed, the base station 2 is prevented from causing the release of the Xn interface between the base station 2 and the source cell (the target cell after the handover), and maintains the user terminal 1 in the immediate handover state; that is, a state in which the user terminal 1 can immediately perform a handover without preparation for a handover such as transmission of a measurement report message (Measurement Report).

Figure 4:
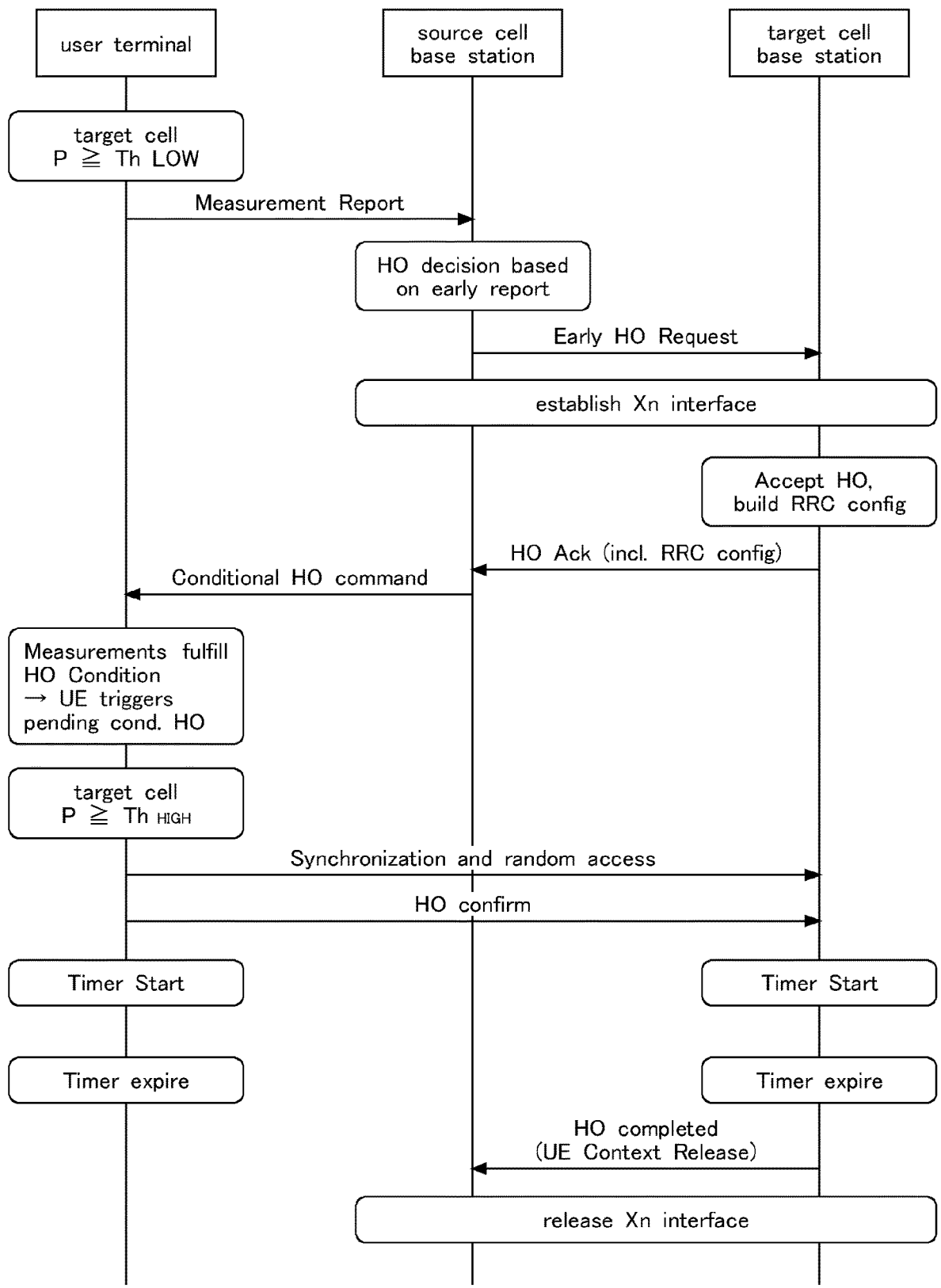
FIG. 4 is a sequence diagram showing an operation procedure of a communication system according to a first embodiment of the present invention.

Next, a sequence diagram showing an operation procedure of a communication system according to a first embodiment of the present invention will be described. FIG. 4 is a sequence diagram showing the operation procedure of the communication system.

The operation procedure is the same as the basic operation adopting the fast handover technology until the user terminal 1 transmits a handover confirmation message (HO confirm) to the target cell base station 2 (FIG. 3).

After transmitting a handover confirmation message (HO confirm) to the target cell base station 2, the user terminal 1 starts measuring time using the timer 19 (see FIG. 5), and maintains a transient state in which the source cell as a handover source is maintained in the handover destination candidate list. After the timer 19 expires, the user terminal 1 deletes the source cell from the handover destination candidate list.

Figure 5:
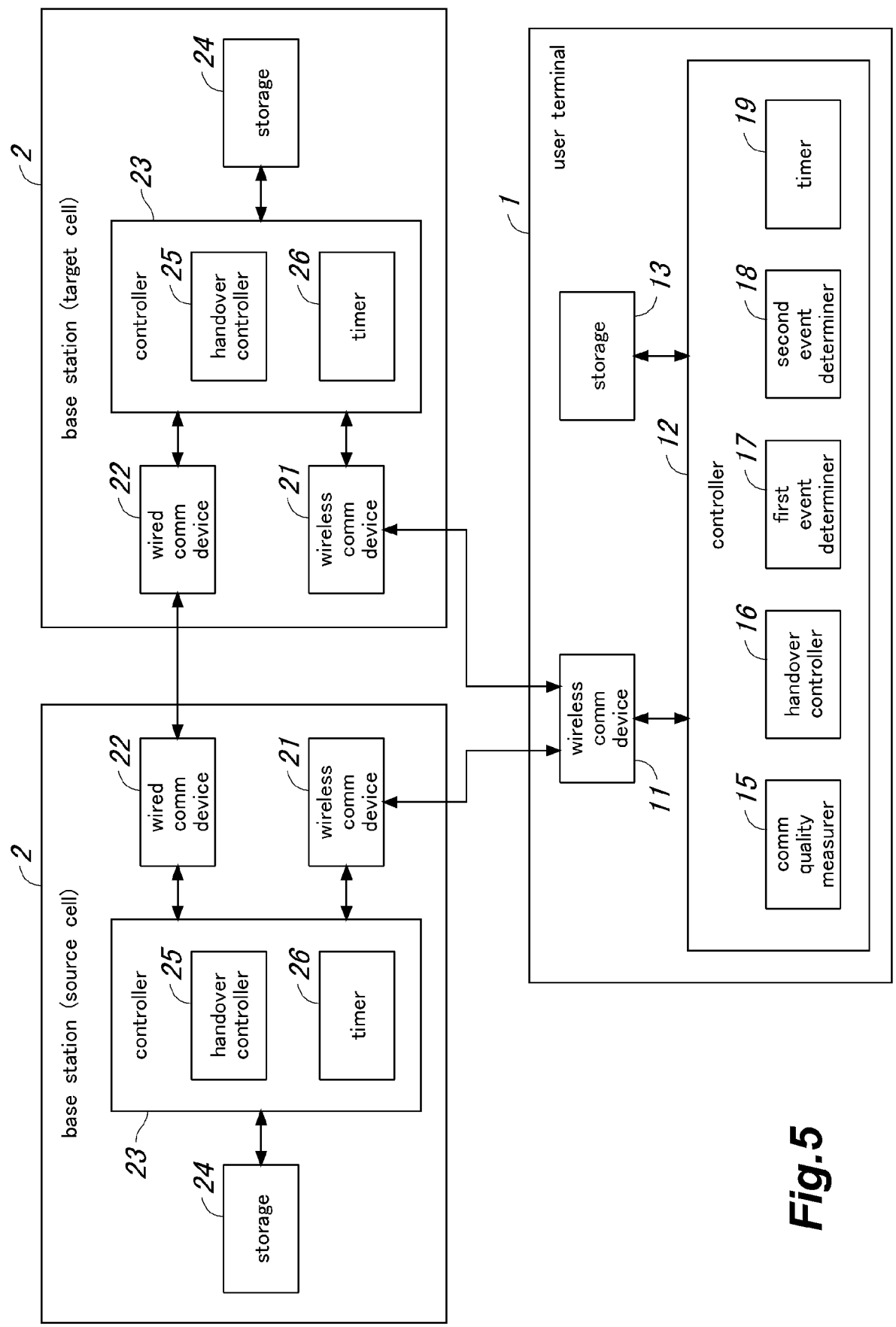
FIG. 5 is a block diagram showing schematic configurations of a user terminal 1 and base stations 2 according to the first embodiment of the present invention.

Upon receiving the handover confirmation message (HO confirm) from the user terminal 1, the target cell base station 2 starts to measure time using the timer 26 (see FIG. 5). After the timer 26 expires, the target cell base station 2 transmits a handover complete message (HO completed), which also serves as a terminal context release message (UE Context Release), to the source cell base station 2 to thereby cause the release of the Xn interface.

Next, schematic configurations of a user terminal 1 and base stations 2 according to the first embodiment of the present invention will be described. FIG. 5 is a block diagram showing schematic configurations of the user terminal 1 and the base stations 2.

The user terminal 1 includes a wireless communication device 11, a controller 12, and a storage 13.

The wireless communication device 11 performs wireless communication with the base stations 2.

The storage 13 stores programs, which are executed by a processor, which configures the controller 12. The storage 13 stores measurements of communication quality of neighboring cells, cell IDs of the base stations 2, threshold values used in the controller 12, the handover destination candidate list, and other information. The handover destination candidate list manages the cell IDs of the base station 2 connected to each other via an Xn interface. The handover destination candidate list includes handover destination's cell ID (ID of the cell, for which a handover preparation is completed) included in a fast handover command message (Conditional HO command) transmitted from the source cell base station 2. The storage 13 also stores the handover source's cell ID.

The controller 12 includes a communication quality measurer 15, a handover controller 16, a first event determiner 17, a second event determiner 18, and a timer 19. The controller 12 is configured by the processor, and each unit of the controller 12 is implemented by executing a program stored in the storage 13 by the processor.

The communication quality measurer 15 measures the communication quality (reception power) of neighboring cells.

The handover controller 16 performs control relating to a fast handover (Conditional HO) based on the determination results provided from the first event determiner 17 and the second event determiner 18. In particular, in the present embodiment, the handover controller 16 performs a basic control of the fast handover (Conditional HO) and also a handover control based on the time measurement result of the timer 19.

The first event determiner 17 compares the reception power of the target cell with the first threshold value ThLOW to thereby perform a first event determination operation; that is, determine whether or not it is time to start preparation for a handover. Specifically, when the reception power is equal to or greater than the first threshold value ThLOW, the first event determiner 17 causes the handover controller 16 to start handover preparation. The first event determiner 17 performs the first event determination operation on cells which are not in the handover destination candidate list.

The second event determiner 18 compares the reception power of the target cell with a second threshold value ThHIGH to thereby perform a second event determination operation; that is, determine whether or not it is time to start preparation for a handover. Specifically, when the reception power is equal to or greater than the second threshold value ThHIGH, the second event determiner 18 causes the handover controller 16 to start handover preparation. The second event determiner 18 performs the second event determination operation on cells which are in the handover destination candidate list.

The timer 19 controls the time for maintaining a state (immediate handover state) in which the user terminal 1 can immediately perform a handover, and measures the remaining time (waiting time) until the user terminal 1 terminates the immediate handover state; that is, the user terminal 1 excludes the source cell as a handover source from the handover destination candidate list. In the present embodiment, when starting to perform a handover, the user terminal 1 starts the timer 19, and maintains the immediate handover state until the timer 19 expires. When the timer 19 expires, the user terminal 1 ends the immediate handover state and enters a state in which the user terminal 1 requires handover preparation.

The expiration time of the timer 19 may be a preset fixed value. In this case, the expiration time of the timer is preferably set to a time required for the user terminal 1 to move in a direction away from the center of a cell by a predetermined distance represented based on the cell radius, for example, $\frac{1}{10}$ of the cell radius.

Specifically, assuming that a user carrying a user terminal 1 moves on foot, when, for example, the moving speed of the user terminal 1 is 80 m/min, which is a general walking speed of a person, and the cell radius is e.g. 1.5 km, the time required for the user terminal 1 to move by 150 m, which is $\frac{1}{10}$ of the cell radius, is about 2 minutes, and thus the expiration time of the timer is set to 2 minutes.

The expiration time of the timer 19 may be set based on the moving speed of the user terminal 1, the moving direction of the user terminal 1, and the cell radius or the like, and the expiration time of the timer may be changed according to the situation.

In this case, the user terminal 1 may acquire the location information records of the user terminal 1 using a positioning system such as a GPS, and then acquire the moving speed and the moving direction of the user terminal 1 based on the transition of the location information records, and may acquire cell information such as the cell radius from the base station 2. The base station 2 may acquire the moving speed and the moving direction of the user terminal 1 from the user terminal 1, and may acquire the cell information such as the cell radius stored in the base station 2.

The timer may be configured such that, when the user terminal 1 moves out of the source cell communication area, the timer stops measuring time and is forced to expire, or the timer may be configured such that, in the same situation, the timer continues to measure time. When the timer is configured to stop measuring time in such a situation, resources of an Xn interface can be reduced. When the timer is configured to continue to measure time, a load on the network can be reduced because the user terminal 1 is prevented from transmitting a measurement report message even when the user terminal 1 returns to the communication area of the source cell.

A base station 2 includes a wireless communication device 21 (first communication device), a wired communication device 22 (second communication device), a controller 23, and a storage 24.

The wireless communication device 21 performs wireless communication with the user terminal 1.

The wired communication device 22 performs wired communication with another base station 2. The wired communication device 22 can be replaced with a wireless communication device.

The storage 24 stores programs, which are executed by a processor, which configures the controller 23.

The controller 23 includes a handover controller 25 and a timer 26. The controller 23 is configured by the processor, and each unit of the controller 23 is implemented by executing a program stored in the storage 24 by the processor.

The handover controller 25 performs control relating to a fast handover (Conditional HO). In particular, in the present embodiment, the handover controller 25 performs a basic control of the fast handover (Conditional HO) and also a handover control based on the time measurement result of the timer 26.

The timer 26 controls the time of the release of the Xn interface, and measures the remaining time (waiting time) until the Xn interface is released. In the present embodiment, the base station 2 starts the timer 26 when a handover is performed, and suspends the release of the Xn interface until the timer 26 expires, and causes the release of the Xn interface when the timer 26 expires.

The expiration time of the timer 26 is the same period as that of the timer 19 of the user terminal 1. The timer 26 of the base station 2 operates along with the timer 19 of the user terminal 1, and the time of starting preparation of a handover by the user terminal 1 can be set to the same as the time when the base stations 2 cause the release of an Xn interface.

Figure 6:
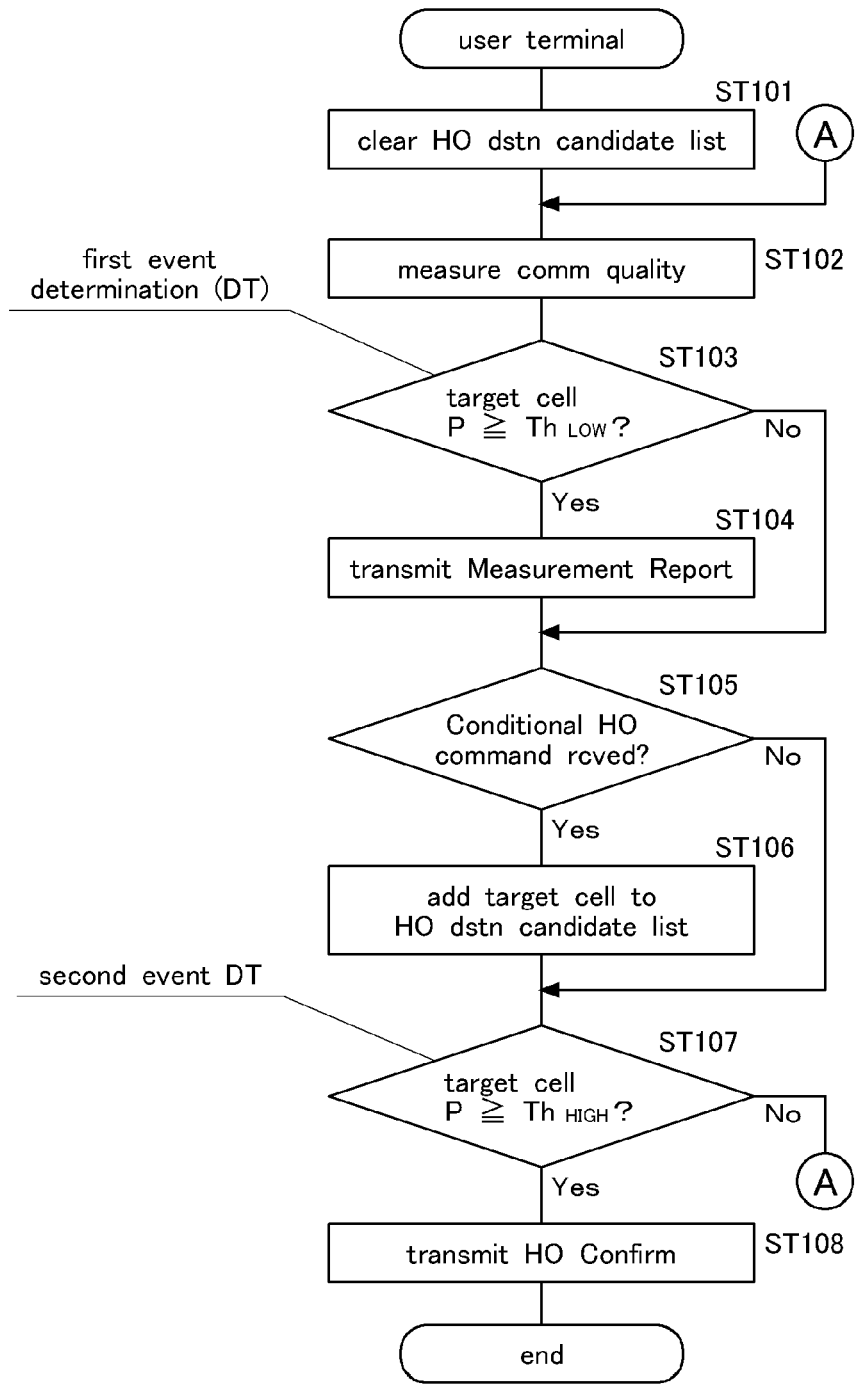
FIG. 6 is a flowchart showing a basic operation procedure of a fast handover operation performed by the user terminal 1.

Next, a basic operation procedure of a fast handover operation performed by the user terminal 1 will be described. FIG. 6 is a flowchart showing the basic operation procedure of a fast handover operation performed by the user terminal 1.

In the user terminal 1, first, the handover controller 16 clears the handover destination candidate list in the storage 13 (ST101). Specifically, the handover controller 16 deletes all cells from the handover destination candidate list.

Next, the communication quality measurer 15 measures the communication quality of neighboring cells (ST102). Then, the first event determiner 17 performs a first event determination operation; that is, determines whether or not the reception power P is equal to or greater than the first threshold value ThLOW for each of the neighboring cells (target cell) which are not listed in the handover destination candidate list (ST103).

If the reception power P is equal to or greater than the first threshold value ThLOW (Yes in ST103), the handover controller 16 transmits a measurement report message (Measurement Report) from the wireless communication device 11 to the source cell base station 2 (ST104), and the process proceeds to ST105. If the reception power P is less than the first threshold value ThLOW (No in ST103), the handover controller 16 does not transmit a measurement report message (Measurement Report) (ST104), and the process proceeds to ST105.

Next, the controller determines whether or not the wireless communication device 11 receives a fast handover command message (Conditional HO command) transmitted from the source cell base station 2 (ST105).

If the wireless communication device 11 receives a fast handover command message (Yes in ST105), the controller adds the target cell notified by the message to the handover destination candidate list (ST106), and the process proceeds to ST107. If the wireless communication device 11 does not receive a fast handover command message (No in ST107), the controller does not perform the addition process (ST106), and the process proceeds to ST107.

Next, the second event determiner 18 performs a second event determination operation; that is, determines whether or not the reception power P is equal to or greater than the second threshold value ThHIGH for each of the neighboring cells (target cell) which are listed in the handover destination candidate list (ST107).

If the reception power P is equal to or higher than the second threshold value ThHIGH (Yes in ST107), the handover controller 16 transmits a handover confirmation message (HO confirm) from the wireless communication device 11 to the target cell base station 2 to thereby perform the handover (ST108). If the reception power P is less than the second threshold value ThHIGH (No in ST107), the process returns to ST102.

Figure 7:
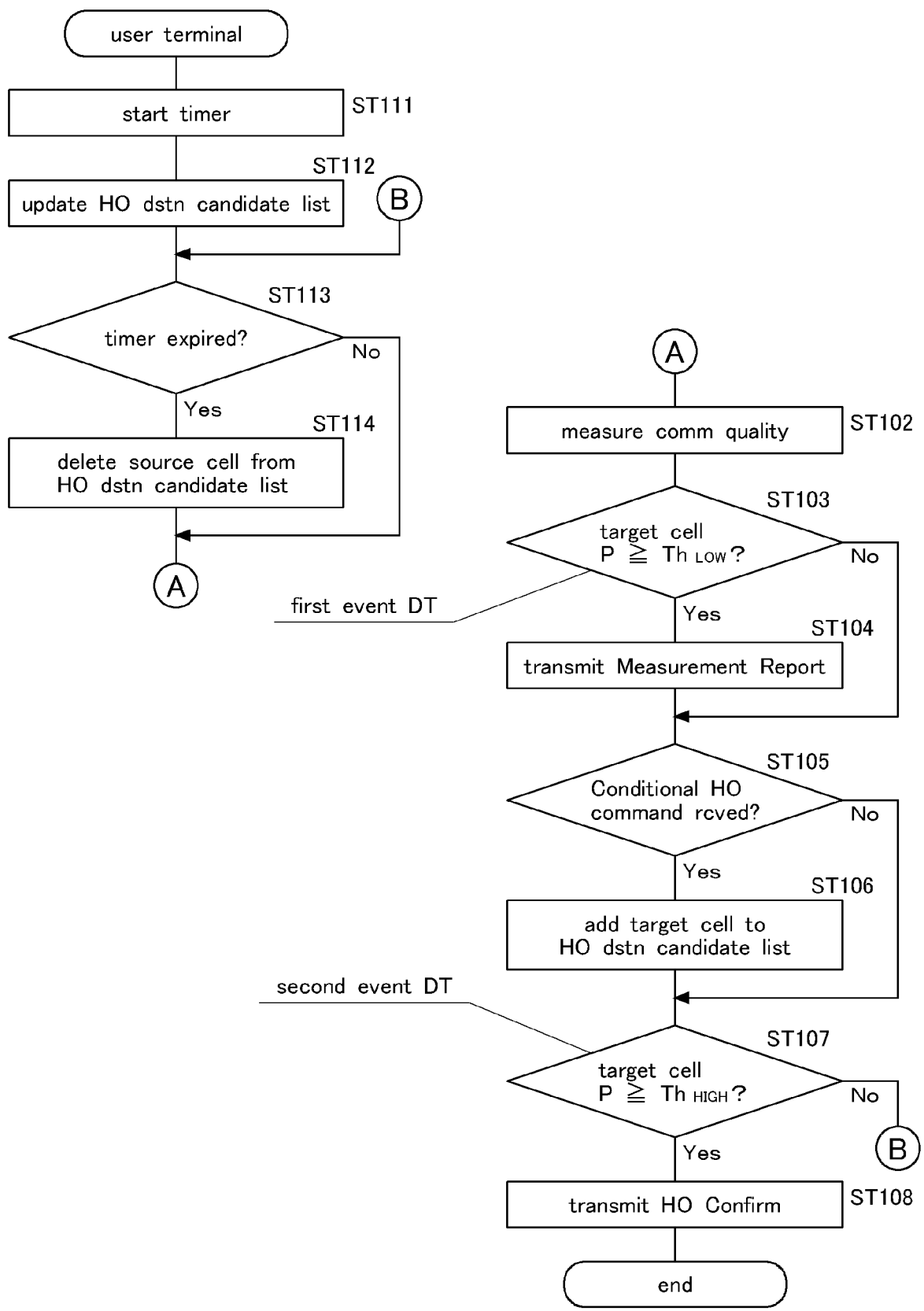
FIG. 7 is a flow chart showing an operation procedure of the user terminal 1 according to the first embodiment of the present invention.

Next, an operation procedure of the user terminal 1 according to the first embodiment of the present invention will be described. FIG. 7 is a flow chart showing the operation procedure of the user terminal 1.

When a handover is performed, the user terminal 1 first starts the timer 19 (ST111). Next, the user terminal 1 updates the handover destination candidate list in the storage 13 (ST112). Specifically, the user terminal 1 leaves the source cell (cell of handover source) in the handover destination candidate list and deletes the other cells from the handover destination candidate list. Then, the user terminal 1 determines whether or not the timer 19 has expired (ST113).

If the timer 19 has not expired (No in ST113), the process proceeds to ST102 without the user terminal 1 performing the deletion of the source cell from the handover destination candidate list (ST114). The subsequent processing steps ST102 to ST108 are the same as those of the basic operation of the fast handover (Conditional HO) (see FIG. 6).

The source cell as a handover source remains in the handover destination candidate list at this point and thus is excluded from the targets of the first event determination operation (ST103). As a result, even if the reception power P of the source cell (target cell after the handover) is equal to or greater than the first threshold value ThLOW, the handover controller 16 does not transmit a measurement report message (Measurement Report).

If the timer 19 has expired (Yes in ST113), the source cell is deleted from the handover destination candidate list (ST114), and the process proceeds to ST102.

The source cell as a handover source does not remain in the handover destination candidate list at this point and thus is a target of the first event determination operation (ST103). As a result, if the reception power P of the source cell (target cell after the handover) is equal to or greater than the first threshold value ThLOW, the handover controller 16 transmits a measurement report message (Measurement Report).

Figure 8:
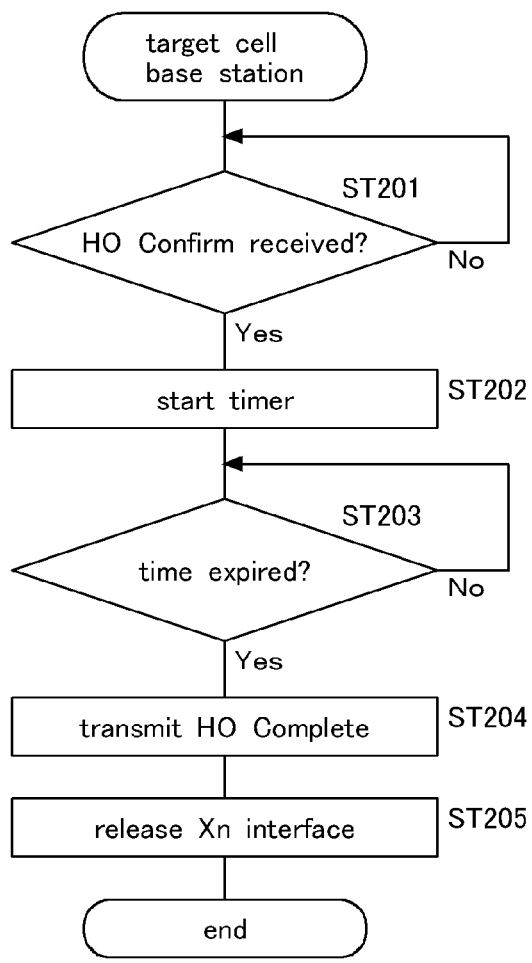
FIG. 8 is a flow chart showing an operation procedure of the base station 2 of a target cell according to the first embodiment of the present invention.

Next, an operation procedure of the target cell base station 2 according to the first embodiment of the present invention will be described. FIG. 8 is a flow chart showing the operation procedure of the target cell base station 2.

The target cell base station 2 receives a handover confirmation message (HO confirm) from the user terminal 1 at the wireless communication device 21, and when the handover is performed (Yes in ST201), the target cell base station 2 starts the timer 26 (ST202).

If the timer 26 expires (Yes in ST202), the wired communication device 22 transmits a handover complete message (HO Complete), which also serves as a terminal context release command (UE Context Release), to the source cell base station 2 (ST204) to thereby cause the release of an Xn interface (ST205).

First Variation of First Embodiment

Figure 9:
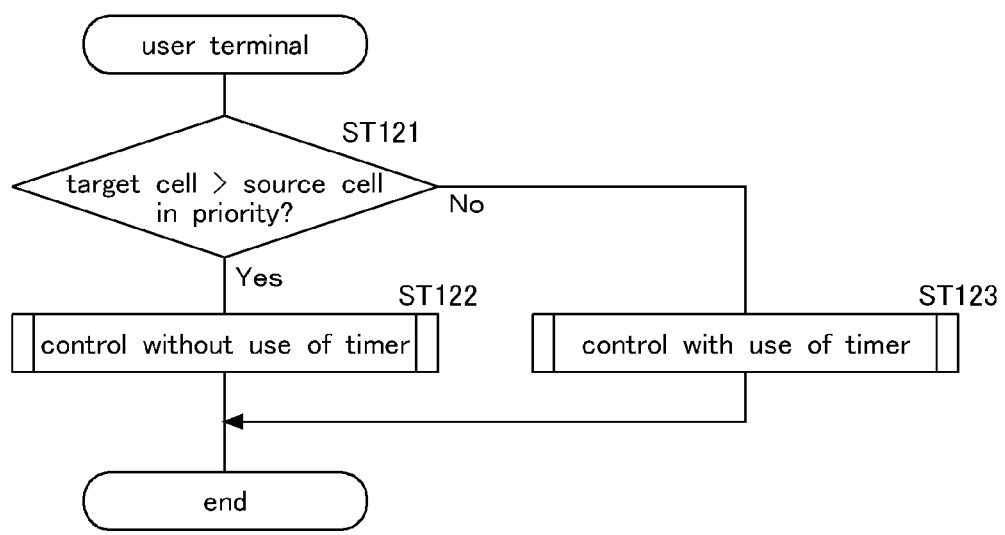
FIG. 9 is a flow chart showing an operation procedure of a user terminal 1 according to a first variation of the first embodiment of the present invention.

Next, a variation of the first embodiment of the present invention will be described. Except for what will be discussed here, this embodiment is the same as the above-described embodiment. FIG. 9 is a flow chart showing an operation procedure of a user terminal 1 according to the first variation of the first embodiment of the present invention.

In the first variation of the first embodiment, each cell is given priority based on the Radio Access Technology (RAT) used by the cell, and the user terminal 1 selects the cell with higher priority as a handover destination. When the user terminal 1 performs a handover and transmits a handover confirmation message (HO confirm) to the target cell base station 2, the user terminal 1 determines whether or not to perform a timing control using the timer 19 by comparing the priority of the source cell with that of the target cell.

That is, when the priority of the target cell is lower than that of the source cell and thus there is a high probability of occurrence of a handover in which the communication destination of the user terminal 1 is changed back to the source cell, the user terminal 1 starts the timer 19 and performs a timing control by using the timer 19. When the priority of the target cell is higher than that of the source cell and thus there is a low probability of occurrence of a handover back to the source cell, the user terminal 1 does not start the timer 19 and performs the basic control of fast handover.

Specifically, as shown in FIG. 9, first, the user terminal 1 determines whether or not the target cell has a higher priority than the source cell (ST121). If the target cell has a higher priority than that source cell (Yes in ST121), the process proceeds to the step in which the user terminal 1 performs a control without using the timer 19 (ST122). If the target cell has a lower priority than or same priority as the source cell (No in ST121), the process proceeds to the step in which the user terminal 1 performs a control by using the timer 19 (ST123).

The operation of the control without using the timer 19 (ST122) is the same as the basic operation of the fast handover (Conditional HO) technology (FIG. 6). The operation of the control by using the timer 19 (ST123) is the same as that of the first embodiment of the present invention (FIG. 7).

It should be noted that, when the user terminal 1 performs the control without using the timer 19, the target cell base station 2 also performs the control without using the timer 26. In this case, the target cell base station does not start the timer 26 (ST202) and does not determine whether or not the timer 26 expires as in the operation procedure of FIG. 8. That is, upon receiving a handover confirmation message (HO confirm) from the user terminal 1 (Yes in ST201), the target cell base station 2 transmits a handover complete message (HO completed), which also serves as a terminal context release message (UE Context Release), to the source cell base station 2 (ST204) to thereby cause the release of the Xn interface (ST205).

In this way, in the prevent embodiment, when the user terminal 1 performs a handover to the target cell and the currently-connected target cell has a higher priority than the source cell and thus there is a high probability of occurrence of a handover back to the source cell, the user terminal 1 can perform the timing control, thereby reducing the frequency of transmission of measurement report messages from the user terminal 1.

Priorities to be given to cells may be fixedly preset for the respective types of Radio Access Technologies (RATs) used by cells (such as 3G, LTE, 5G). For example, the priority of small cells (5G) is set higher than that of macro cells (LTE). In this case, a priority list including the preset priorities for respective RATs may be stored in the storage 13 so that the priority for a cell can be determined based on the RAT referring to the priority list.

The priority of a cell may be changed depending on the situation in consideration of the RAT and any other additional condition. For example, the priority of a cell may be lowered when a relatively large number of user terminals 1 are connected to the cell. In this case, a new user terminal 1 is assigned to a cell to which a relatively small number of user terminals 1 are connected, thereby enabling a cell load dispersion.

Second Variation of First Embodiment

Figure 10:
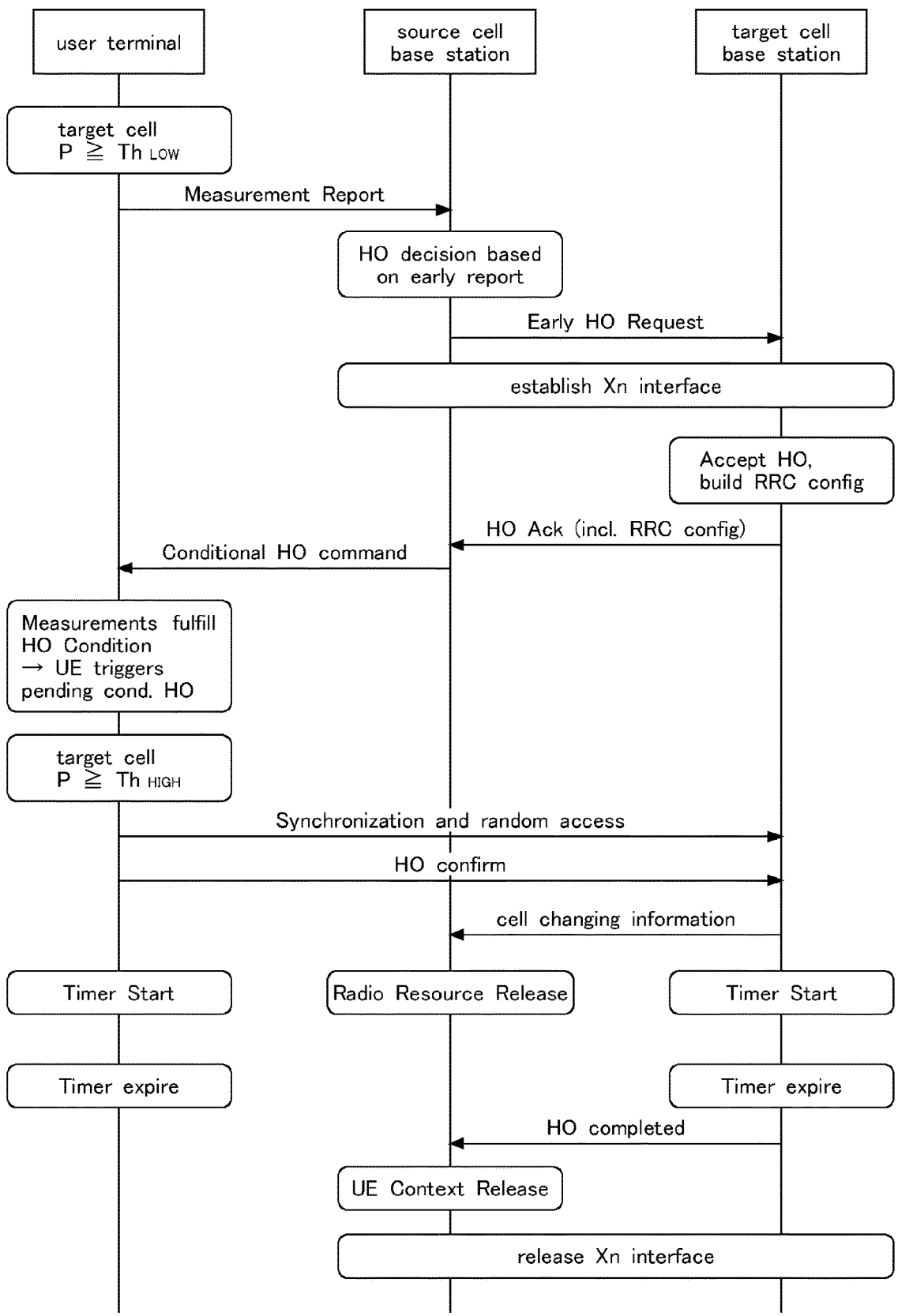
FIG. 10 is a sequence diagram showing an operation procedure of a communication system according to a second variation of the first embodiment of the present invention.

Next, a second variation of the first embodiment of the present invention will be described. Except for what will be discussed here, this embodiment is the same as the above-described embodiments. FIG. 10 is a sequence diagram showing an operation procedure of a communication system according to the second variation of the first embodiment of the present invention.

In the first embodiment, upon receiving a handover confirmation message (HO confirm) from the user terminal 1, a target cell base station 2 starts the timer 26, and when the timer 26 expires, the target cell base station 2 transmits a handover complete message (HO completed), which also serves as a terminal context release message (UE Context Release), to a source cell base station 2 to thereby cause the release of an Xn interface.

In this case, upon receiving the handover complete message (HO completed) from the target cell base station 2, the source cell base station 2 causes the release of the Xn interface, releases the context of the user terminal 1 which has completed the handover, and concurrently stops processing operations relating to wireless communication control such as the release of the wireless communication resources allocated to the user terminal 1 (Radio Resource Release).

In this way, in the first embodiment, the source cell base station 2 causes the release of the Xn interface concurrently with stopping the processing operations relating to wireless communication control of the user terminal 1 which has completed the handover. Therefore, until the timer 26 expires, the source cell base station 2 maintains the wireless communication resources allocated to the user terminal 1 which has completed the handover, and continues the processing operations relating to wireless communication control of the user terminal 1, which means that the source cell base station 2 continues to transmit unnecessary messages.

In this view, in the second variation of the first embodiment, a handover complete message (HO completed), which also serves as a terminal context release message (UE Context Release) used in the first embodiment, is separated into two distinct messages so that the source cell base station 2 can stop the processing operations relating to wireless communication control of the user terminal 1 which has completed the handover, and separately causes the release of the Xn interface at different times.

That is, when the handover is performed, the target cell base station 2 transmits to the source cell base station 2 a message notifying the source cell that the handover destination of the user terminal 1 has been switched by the handover, thereby causing the source cell base station 2 to stop the processing operations relating to wireless communication control of the user terminal 1, and after that, when the timer 26 expires, the target cell base station 2 transmits a terminal context release message for the user terminal 1 to the source cell base station 2.

Specifically, as shown in FIG. 10, upon receiving a handover confirmation message (HO confirm) from the user terminal 1, the target cell base station 2 starts the timer 26 concurrently with transmitting a cell changing notification message (cell changing information) to the source cell base station 2.

Upon receiving the cell changing notification message from the target cell base station 2, the source cell base station 2 stops processing operations relating to wireless communication control such as the release of the wireless communication resources allocated to the user terminal 1 (Radio Resource Release).

Then, when the timer 26 expires, the target cell base station 2 transmits a handover complete message (HO completed), which also serves as a terminal context release message (UE Context Release), to a source cell base station 2 to thereby cause the release of an Xn interface.

In this way, in the second variation of the first embodiment, immediately upon receiving a handover confirmation message (HO confirm) from the user terminal 1, the source cell stops processing operations relating to wireless communication control for the user terminal 1 which has completed the HNDOR, and thus, the source cell base station 2 is prevented from continuing to transmit unnecessary messages.

Second Embodiment

Next, a second embodiment of the present invention will be described. Except for what will be discussed here, this embodiment is the same as the above-described embodiments.

In the first embodiment, two events are determined as events relating to a fast handover (Conditional HO); that is, a first event, which specifies a time to start preparation of a handover, and a second event, which specifies a time to perform the handover. However, in the present embodiment, a third event which specifies a time to cause the release of an Xn interface is determined as an additional event relating to a fast-handover, and when the third event occurs, a source cell base station causes the release of an Xn interface, whereby, even when the handover is performed, until the third event occurs, the source cell base station does not cause the release of the Xn interface between the SECLL base station and a target cell base station.

In particular, in the present embodiment, the third event is determined as a state of the user terminal 1 in which the measurement, specifically, the reception power of the communication quality of the source cell is equal to or less than a third threshold value ThEXIT, and the user terminal 1 is configured to determine whether or not the reception power is equal to or less than the third threshold value ThEXIT. When the reception power is equal to or less than the third threshold value ThEXIT, the user terminal 1 transmits a release event occurrence report message to the currently-connected base station 2. Upon receiving the release event occurrence report message, the base station 2 causes the release of the Xn interface.

The third threshold value ThEXIT may be a present fixed value. In particular, the third threshold value ThEXIT is lower than the first threshold value ThLOW by several dB (e.g. 5 dB), the first threshold value being used to determine whether or not it is the time to start preparation of a handover.

Figure 11:
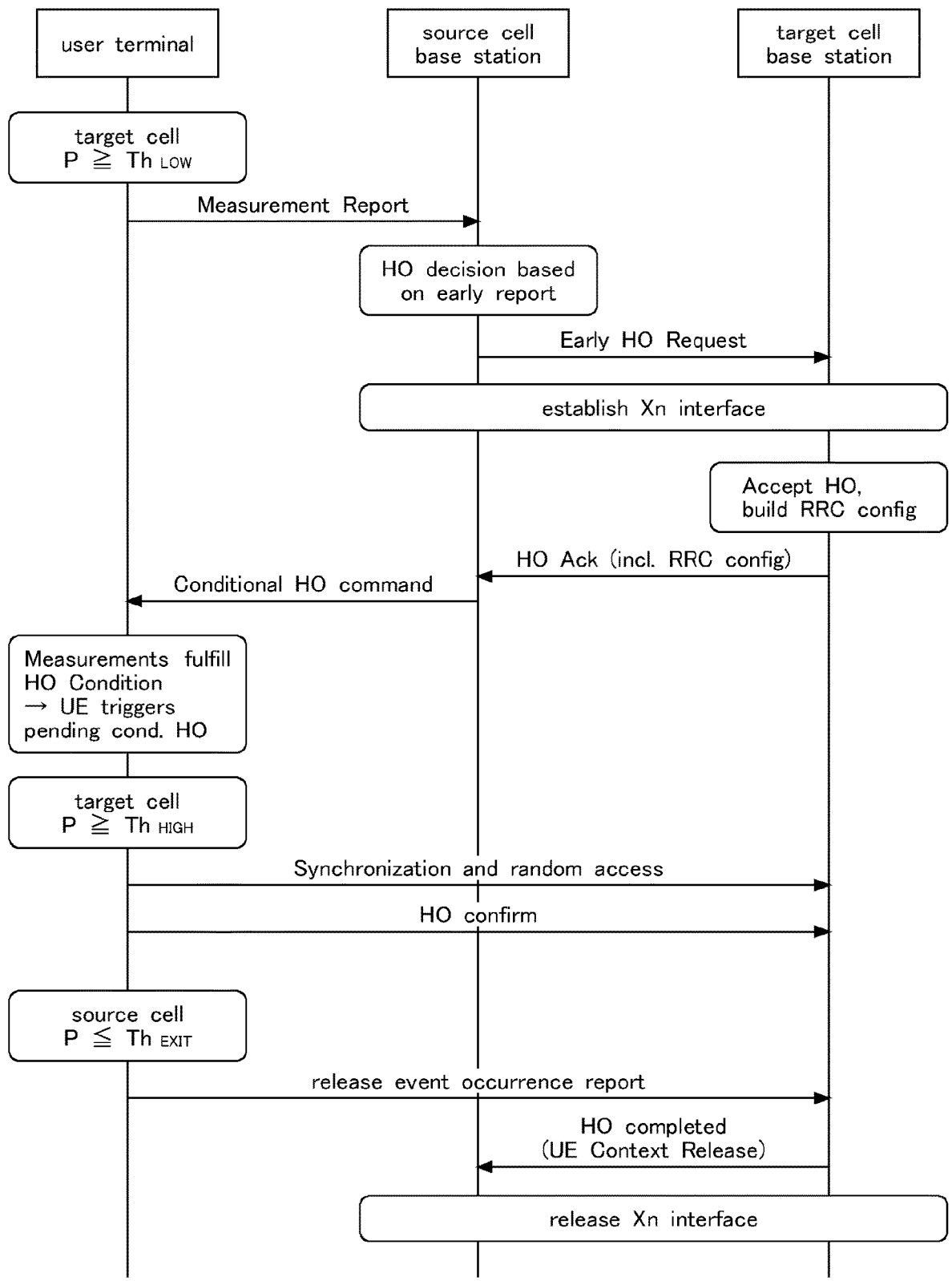
FIG. 11 is a sequence diagram showing an operation procedure of a communication system according to a second embodiment of the present invention.

Next, a sequence diagram showing an operation procedure of a communication system according to a second embodiment of the present invention will be described. FIG. 11 is a sequence diagram showing the operation procedure of the communication system.

The processing operations in which the user terminal 1 transmits a handover confirmation message (HO confirm) to a target cell (the currently-connected cell) are the same as those in the first embodiment (see FIG. 4).

The user terminal 1 transmits a handover confirmation message (HO confirm) to the target cell base station 2 to determine whether or not the reception power of the source cell (cell of the handover source) is equal to or less than a threshold value ThEXIT. If the reception power of the source cell is equal to or lower than the threshold value ThEXIT, the user terminal 1 transmits a release event occurrence report message to the target cell base station 2.

When the target cell base station 2 receives the handover confirmation message (HO confirm) from the user terminal 1, and then receives the release event occurrence report message, the target cell base station 2 transmits a handover complete message (HO completed), which also serves as a terminal context release message (UE Context Release), to the source cell base station 2 to thereby cause the release of the Xn interface.

Figure 12:
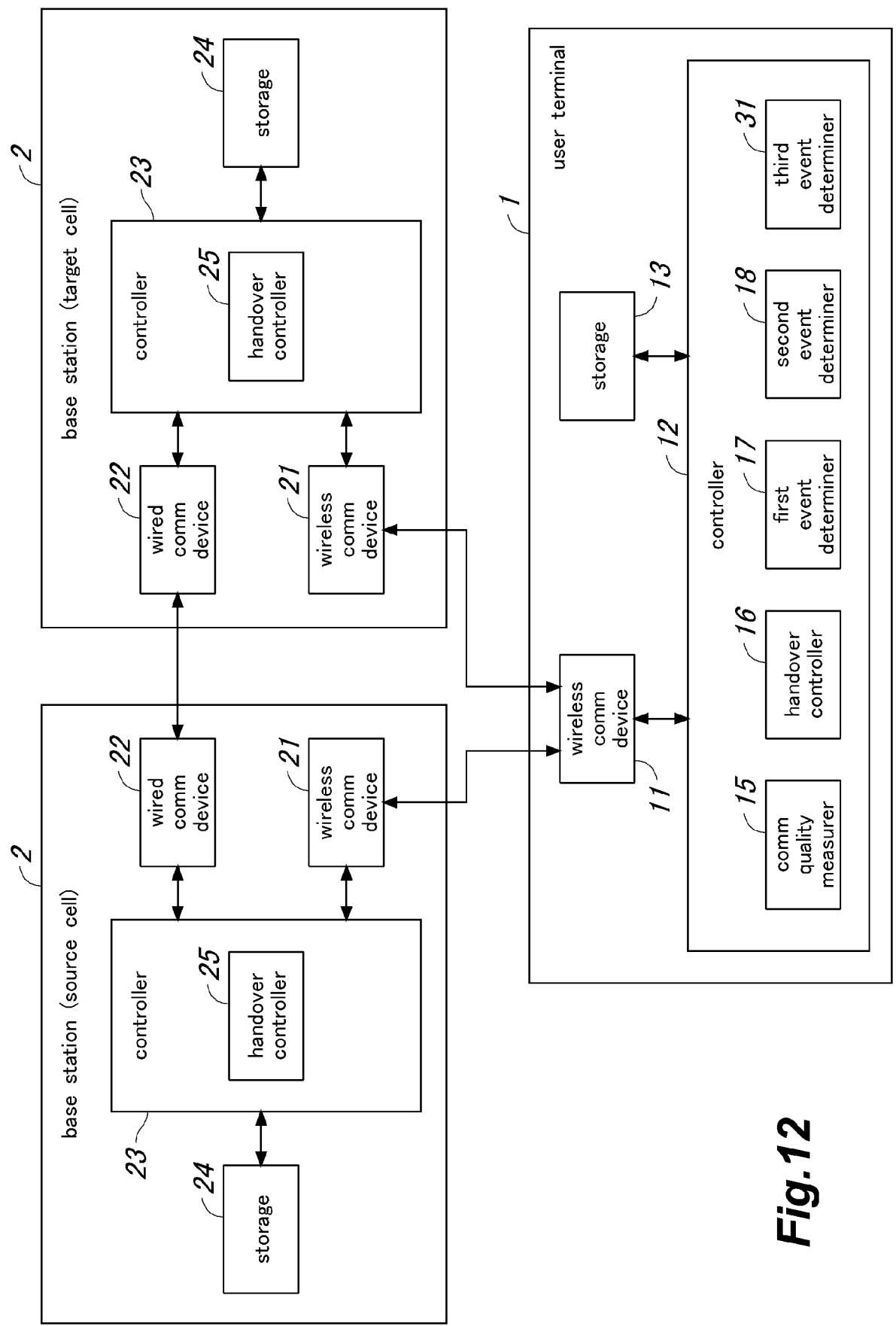
FIG. 12 is a block diagram showing schematic configurations of a user terminal 1 and base stations 2 according to the second embodiment of the present invention.

Next, schematic configurations of a user terminal 1 and base stations 2 according to the second embodiment of the present invention will be described. FIG. 12 is a block diagram showing schematic configurations of the user terminal 1 and the base stations 2.

The configuration of the user terminal 1 is similar to that of the first embodiment (See FIG. 5), but different from the first embodiment in that the controller 12 includes a third event determiner 31 in place of the timer 19 of the first embodiment.

The third event determiner 31 compares the reception power of the source cell (cell of the handover source) with the third threshold value ThEXIT to thereby perform a third event determination operation; that is, determine whether or not it is time to cause the release of an Xn interface. Specifically, when the reception power of the source cell is equal to or less than the third threshold value ThEMT, the handover controller 16 transmits a release event occurrence report message from the wireless communication device 11 to the target cell base station 2 to thereby instruct the target cell base station 2 to cause the release of the Xn interface. The third event determiner 31 performs the third event determination operation on cells which are in the handover destination candidate list.

The configuration of a base station 2 is also similar to that of the first embodiment (See FIG. 5), but different from the first embodiment in that the controller 23 lacks the timer 26 in the first embodiment and that the handover controller 25 is configured to cause the release of the Xn interface when the wireless communication device 21 receives the release event occurrence report message from the user terminal.

Figure 13:
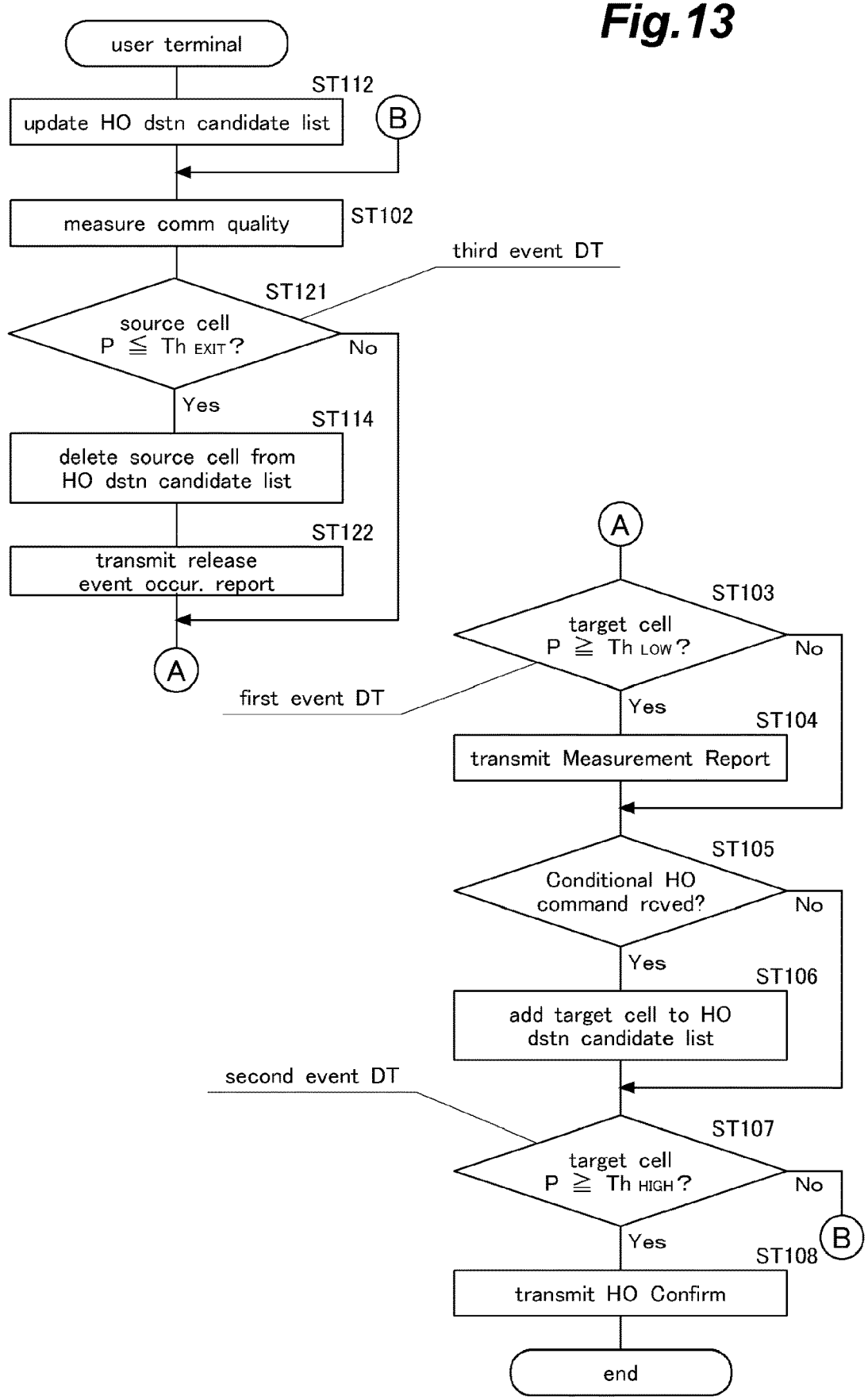
FIG. 13 is a flow chart showing an operation procedure of the user terminal 1 according to the second embodiment of the present invention.

Next, an operation procedure of the user terminal 1 according to the second embodiment of the present invention will be described. FIG. 13 is a flow chart showing the operation procedure of the user terminal 1.

First, the handover controller 16 of the user terminal 1 updates the handover destination candidate list in the storage 13 (ST112). Specifically, the user terminal 1 leaves the source cell (cell of handover source) in the handover destination candidate list and deletes the other cells from the handover destination candidate list, and the communication quality measurer 15 measures the communication quality of neighboring cells (ST102). Then, the handover controller 16 performs the third event determination operation; that is, determines whether or not the reception power of the source cell is equal to or less than the third threshold value ThEXIT (ST121).

If the reception power of the source cell is equal to or less than the third threshold value ThEXIT (Yes in ST121), the user terminal 1 deletes the source cell from the handover destination candidate list (ST114). Then, the handover controller 16 transmits a release event occurrence report message from the wireless communication device 11 to the target cell base station 2 (ST122), and the process proceeds to ST103.

If the reception power of the source cell is more than the third threshold value ThEXIT (No in ST121), the user terminal 1 omits the steps (ST114) and (S122); that is, the user terminal 1 does not perform the deletion of the source cell from the handover destination candidate list (ST114) and the transmission of a release event occurrence report message (ST122), and the process proceeds to ST103.

The subsequent processing steps ST103 to ST108 are the same as those of the operation of the first embodiment (see FIG. 7). In the second event determination operation, if the reception power P is less than the second threshold value ThHIGH (No in ST107), the process returns to ST102.

In this case, if, in the third event determination operation (ST121), the reception power of the source cell is more than the third threshold value ThEXIT (No in ST121), the source cell is left in the handover destination candidate list, which means that the source cell is excluded from the targets of the first event determination operation (ST101). Thus, even if the reception power of the source cell (target cell after the handover) is equal to or greater than the first threshold value ThLOW, the user terminal 1 does not transmit a measurement report message
(Measurement Report).

In other embodiments, the user terminal 1 may be configured such that, if the positive result of the third even determination (i.e. the reception power of the source cell is equal to or less than the third threshold value ThEXIT) is consecutively repeated three times, the user terminal 1 transmits a release event occurrence report. An increase in the number of consecutive positive results of the third event determination operation used as a basis for determination may delay the handover, but can prevent occurrence of the excessively frequent change of the communication destination when the reception power changes in an unstable manner, such as when the user terminal 1 is located at the boundary of two adjoining cells or when one or more obstacles are present.

Figure 14:
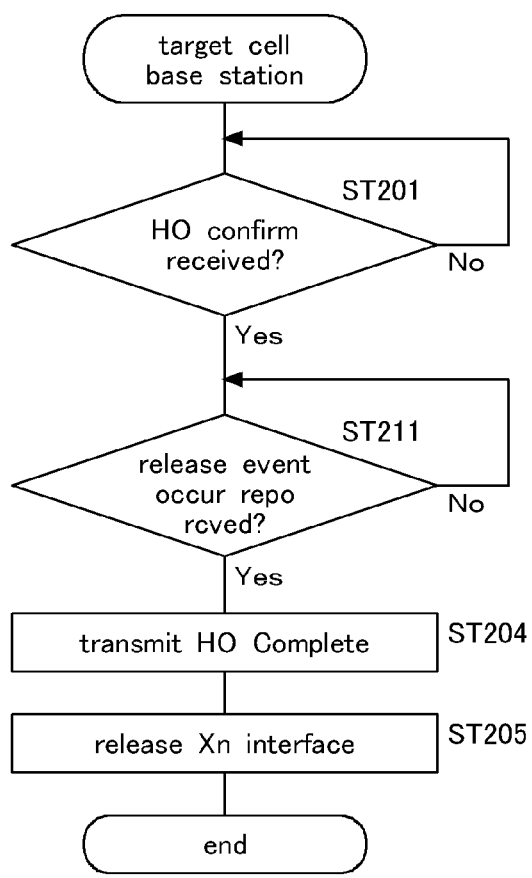
FIG. 14 is a flow chart showing an operation procedure of the base station 2 of a target cell according to the second embodiment of the present invention.

Next, a flow chart showing an operation procedure of the target cell base station 2 according to the second embodiment of the present invention will be described. FIG. 14 is a flow chart showing the operation procedure of the target cell base station 2.

If the target cell base station 2 receives a handover confirmation message (HO confirm) from the user terminal 1 at the wireless communication device 21 (Yes in ST201) and then receives a release event occurrence message (Yes in ST211), the target cell base station 2 transmits a handover complete message (HO Complete), which also serves as a terminal context release command (UE Context Release), to the source cell base station 2 (ST204) to thereby cause the release of an Xn interface (ST205).

In the present invention, the third event, which specifies the time to cause the release of an Xn interface, is determined as a state in which the reception power of the source cell (handover source cell) becomes equal to or less than the third threshold value ThEXIT. However, the user terminal 1 may be configured such that the third event is determined as a state in which the user terminal 1 is not capable of receiving radio waves from the source cell, and that if the user terminal 1 is located in an area in which radio waves from the source cell can be received, the user terminal 1 maintains an Xn interface, and when the user terminal 1 moves out of the area where radio waves from the source cell can be received, the user terminal 1 causes the release of the Xn interface.

Also in the present embodiment, the user terminal 1 may be configured to perform a control based on the priorities of the cells in the same manner as the first variation of the first embodiment. That is, the user terminal 1 determines whether or not to perform the third event determination operation by comparing the priority of the source cell with that of the target cell. Specifically, when the target cell has a lower priority than or same priority as the source cell and thus there is a high probability of occurrence of a handover back to the source cell, the user terminal 1 performs the third event determination operation. When the target cell has a higher priority than the source cell and thus there is a low probability of occurrence of a handover back to the source cell, the user terminal 1 does not perform the third event determination operation, but performs the basic control of fast handover. In this case, priorities to be given to cells may be fixedly preset for the respective types of Radio Access Technologies (RATs) used by the cells (such as 3G, LTE, 5G) in the same manner as the first variation of the first embodiment.

Moreover, in the present embodiment, the target cell base station 2 may be configured to transmit a cell changing notification message (cell changing information), which stops processing operations relating to wireless communication control, and a handover complete message (HO completed), which also serves as a terminal context release message (UE Context Release), to a source cell base station 2 in the same manner as the second variation of the first embodiment.

In addition, in the present embodiment, the user terminal 1 is configured to transmit a release event occurrence report message. However, in other embodiments, the user terminal 1 may be configured to transmit a measurement report message (Measurement Report), which also serves as a release event occurrence report message.

Third Embodiment

Next, a third embodiment of the present invention will be described. Except for what will be discussed here, this embodiment is the same as the above-described embodiments.

When the communication quality of the source cell (the currently-connected cell) is sufficiently high, the user terminal 1 does not need to perform a handover, and furthermore, the user terminal 1 does not need to start preparation for a handover. In this light, in the present embodiment, the user terminal 1 is configured such that the user terminal 1 does not start preparation for a handover to the target cell if the communication quality of the source cell (the currently-connected cell) is sufficiently high, and the user terminal 1 starts preparation for a handover to the target cell when the communication quality of the source cell is lowered.

Figure 15:
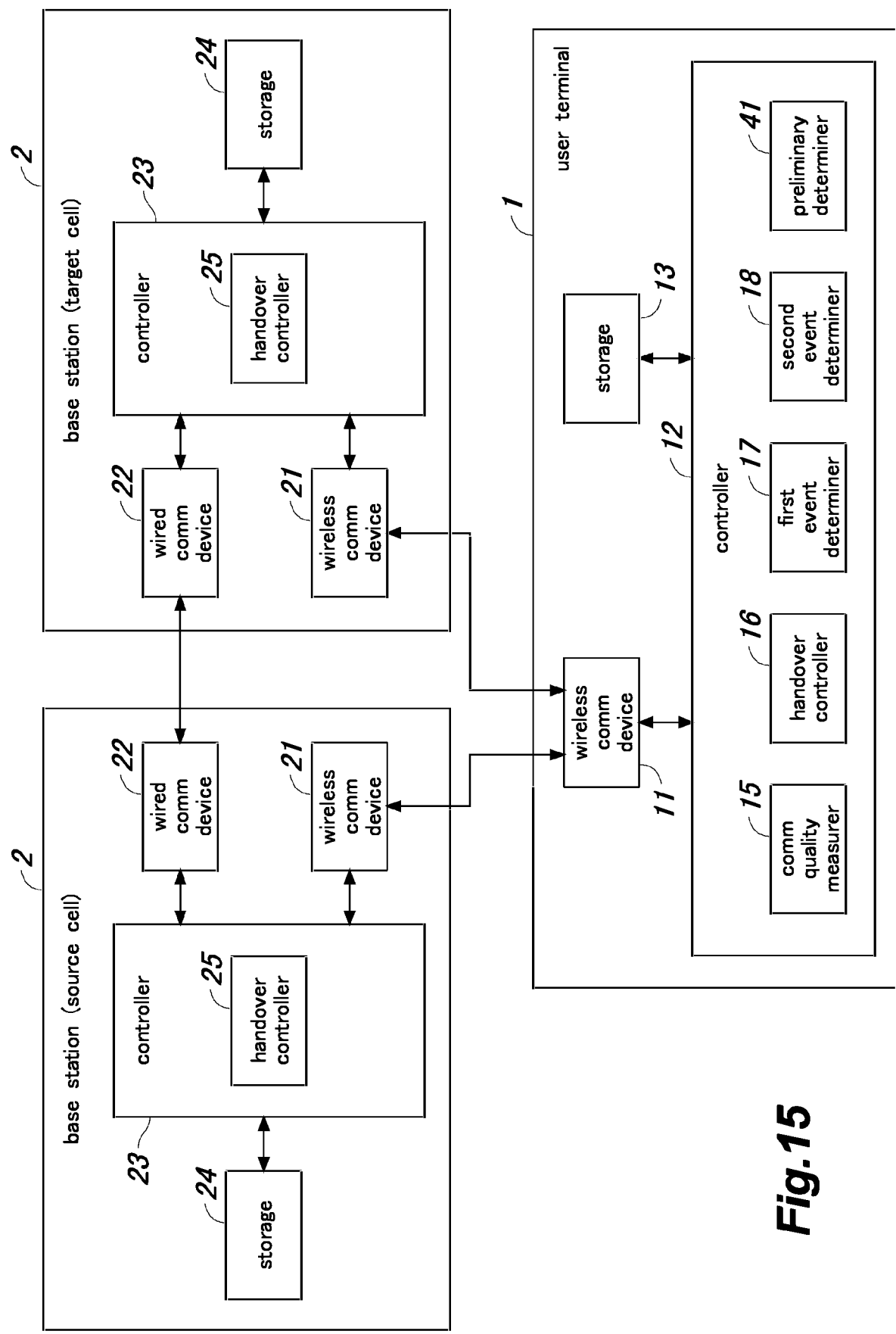
FIG. 15 is a block diagram showing schematic configurations of a user terminal 1 and base stations 2 according to a third embodiment of the present invention.

Next, schematic configurations of a user terminal 1 and base stations 2 according to the third embodiment of the present invention will be described. FIG. 15 is a block diagram showing schematic configurations of the user terminal 1 and the base stations 2.

The configuration of the user terminal 1 is similar to that of the first embodiment (See FIG. 5), but different from the first embodiment in that the controller 12 includes a preliminary determiner 41 in place of the timer 19 of the first embodiment.

The preliminary determiner 41 is configured to perform a preliminary determination operation on whether or not a measurement of communication quality of the source cell is equal to or greater than the second threshold value ThHIGH, and if the measurement of communication quality of the source cell is equal to or greater than the second threshold value ThHIGH, even when the measurement of communication quality of the target cell is equal to or greater than the first threshold value ThLOW, the preliminary determiner prevents the user terminal 1 from starting preparation for a handover to the target cell.

The configuration of the base station 2 is also similar to that of the first embodiment (See FIG. 5), but different from the first embodiment in that the controller 23 lacks the timer 26 of the first embodiment.

Figure 16:
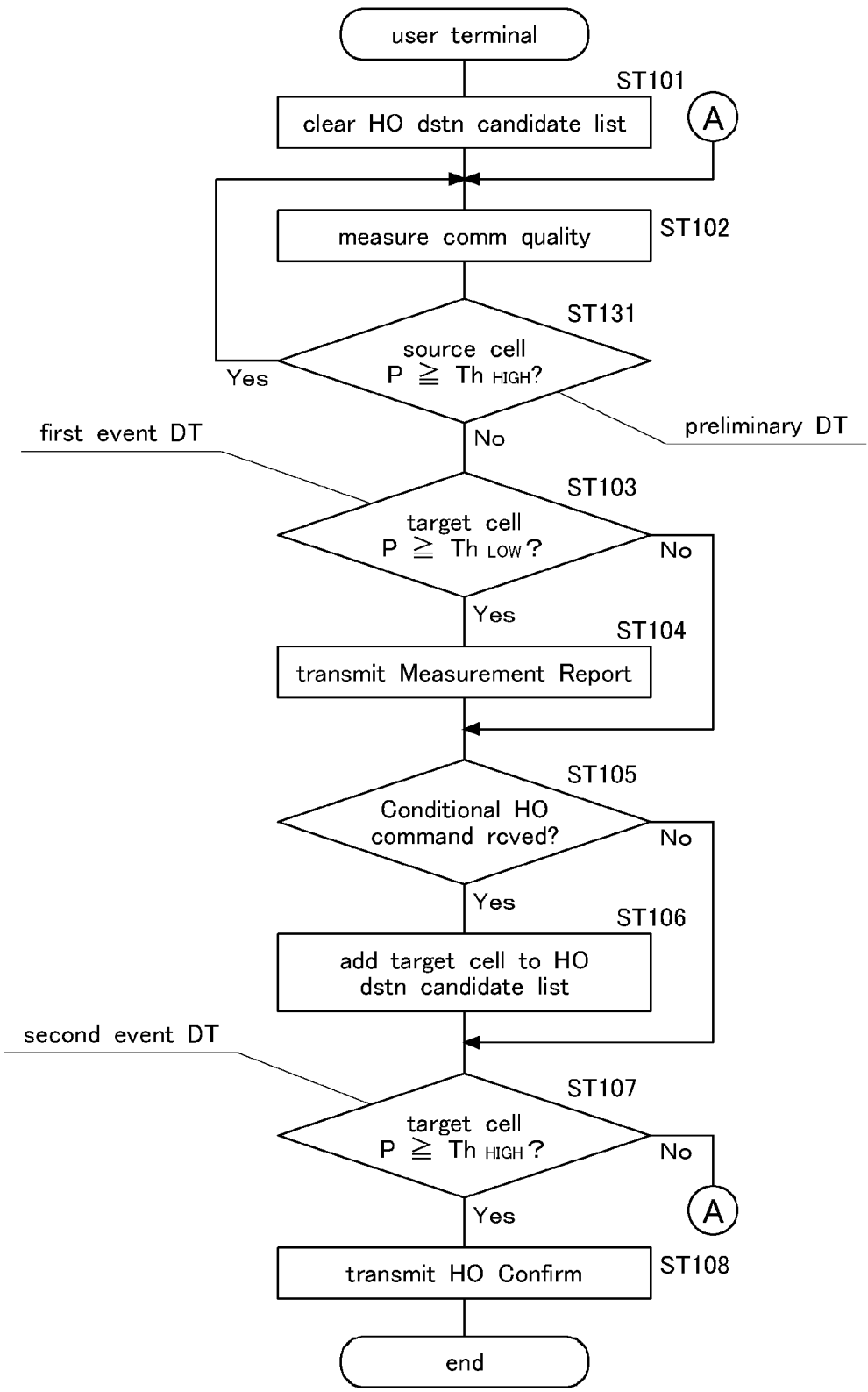
FIG. 16 is a flow chart showing an operation procedure of the user terminal 1 according to the third embodiment of the present invention.

Next, an operation procedure of the user terminal 1 according to the third embodiment of the present invention will be described. FIG. 16 is a flow chart showing the operation procedure of the user terminal 1.

First, the handover controller 16 of the user terminal 1 clears the handover destination candidate list in the storage 13 (ST101). Next, the communication quality measurer 15 measures the communication quality of neighboring cells (ST102). Then, the preliminary determiner 41 is configured to perform a preliminary determination operation on whether or not the reception power of the source cell is equal to or greater than the second threshold value ThHIGH (ST131).

If the reception power P of the source cell is equal to or greater than the second threshold value ThHIGH (Yes in ST131), the process returns to ST102. If the reception power P of the source cell is less than the second threshold value ThHIGH (No in ST131), the process proceeds to ST103.

The subsequent processing steps ST103 to ST108 are the same as those of the basic operation of the fast handover (Conditional HO) (see FIG. 6).

In this way, in the present embodiment, the user terminal 1 performs the preliminary determination operation, and if the reception power P of the source cell is equal to or greater than the second threshold value ThHIGH, the user terminal 1 does not start preparation for a handover to the target cell, in particular, even when the reception power of the target cell is equal to or greater than the first threshold value ThLOW, the user terminal 1 does not transmit a measurement report message. As a result, it is possible to reduce the frequency of transmission of messages.

The configuration of the present embodiment may be combined with a configuration of the first embodiment or the second embodiment. This makes it possible to further reduce the frequency of transmission of messages.

First Variation of Third Embodiment

Figure 17:
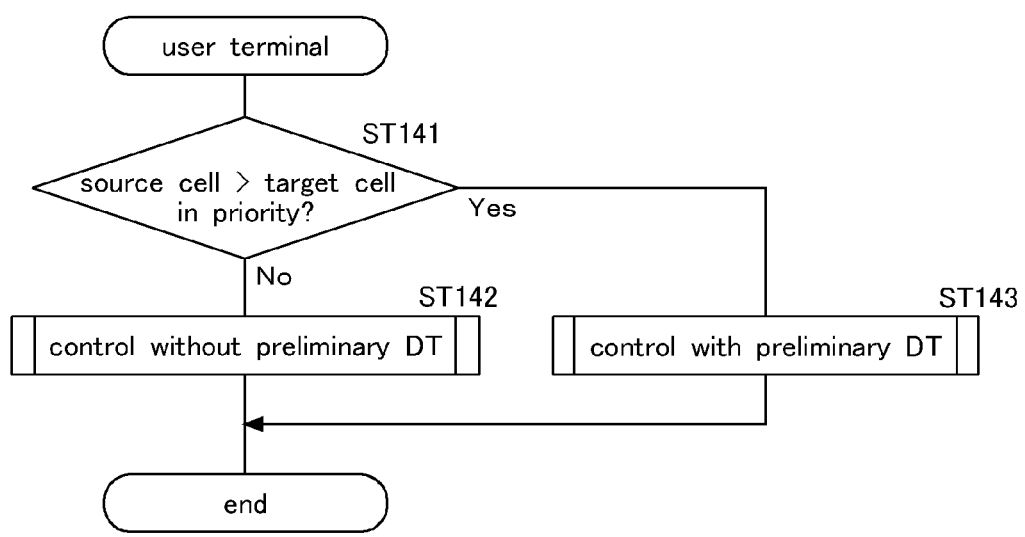
FIG. 17 is a flow chart showing an operation procedure of the user terminal 1 according to a first variation of the third embodiment of the present invention.

Next, a first variation of the third embodiment of the present invention will be described. Except for what will be discussed here, this embodiment is the same as the above-described embodiments. FIG. 17 is a flow chart showing an operation procedure of the user terminal 1 according to the first variation of the third embodiment of the present invention.

When the user terminal 1 is located in a cell with a high priority, if the communication quality of the source cell (currently-connected cell) is sufficiently high, the user terminal 1 does not need to start preparation for a handover. When the user terminal 1 is located in a cell with a low priority, the user terminal 1 is desirably urged to perform a handover to a cell with a high priority, and thus the user terminal 1 preferably starts preparation for a handover at earlier time.

In this light, in the first variation of the third embodiment, the user terminal 1 is configured such that, if the source cell (currently-connected cell) has a higher priority than the target cell, the user terminal 1 performs the preliminary determination operation, and if the source cell has a lower priority than or same priority as the target cell, the user terminal 1 does not perform the preliminary determination operation. Priorities to be given to cells may be fixedly preset for the respective types of Radio Access Technologies (RATs) used by the cells.

Specifically, as shown in FIG. 17, the user terminal 1 first determines whether or not the source cell has a higher priority than the target cell (ST141). If the source cell has a lower priority than or same priority as the target cell (No in ST141), the process proceeds to the control in which the user terminal 1 does not perform the preliminary determination operation (ST142). If the source cell has a higher priority than the target cell (Yes in ST141), the process proceeds to the control in which the user terminal 1 performs the preliminary determination operation (ST143).

The control in which the user terminal 1 does not perform a preliminary determination operation (ST142) is the same as that of the basic operation of the fast handover (Conditional HO) (see FIG. 6). The control in which the user terminal 1 performs the preliminary determination operation (ST142) is the same as that of the third embodiment (see FIG. 16).

In this way, in the first variation of the third embodiment, when the source cell has a lower priority, the user terminal 1 does not perform the preliminary determination operation, and thus the Xn interface is released at earlier time, and when the source cell has a higher priority, the user terminal 1 performs the preliminary determination operation, and thus the Xn interface is released at later time. This configuration enables efficient use of Xn interface resources depending on the priorities of cells.

Second Variation of Third Embodiment

Figure 18:
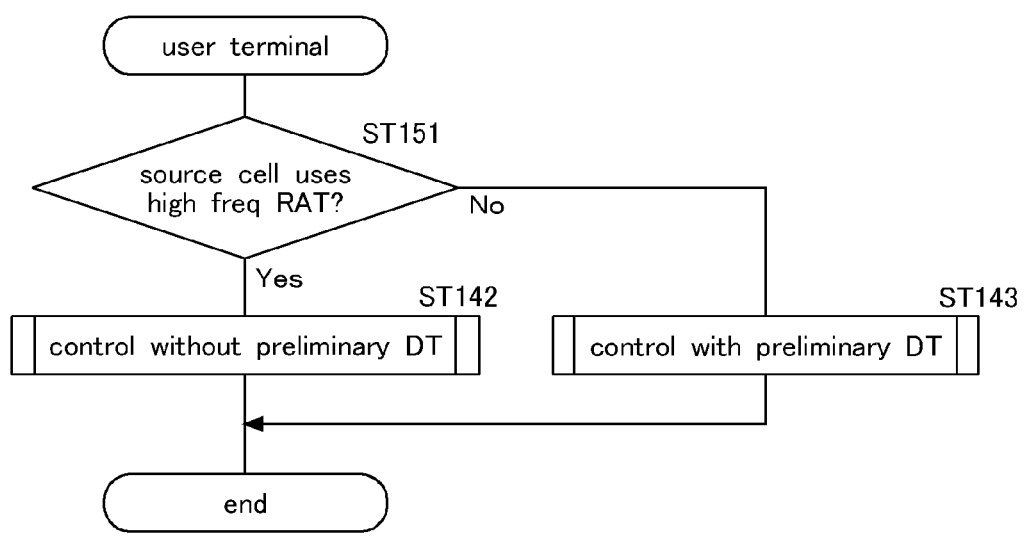
FIG. 18 is a flow chart showing an operation procedure of the user terminal 1 according to a second variation of the third embodiment of the present invention.

Next, a second variation of the third embodiment of the present invention will be described. Except for what will be discussed here, this embodiment is the same as the above-described embodiments. FIG. 18 is a flow chart showing an operation procedure of the user terminal 1 according to the second variation of the third embodiment of the present invention.

When the source cell to which the user terminal 1 is currently connected uses a RAT (Radio Access Technology) using a high frequency band (such as a high SHF band or an EHF band), which is more affected by obstacles, intermittent communication breaks are likely to occur due to obstacles. Such an abrupt communication break eliminates an advantage of a fast handover (Conditional HO); that is, the capability of fast handover. When the currently-connected source cell uses a RAT using a non-high frequency band (such as a low SHF or a UHF), which is less affected by obstacles, communication breaks due to obstacles are less likely to occur. As a result, use of a fast handover (Conditional HO) ensures that a handover can be quickly performed.

In this light, in the second variation of the third embodiment, the user terminal 1 is configured such that, if the source cell uses a RAT using a high frequency band, the user terminal 1 does not perform the preliminary determination operation, and if the source cell uses a RAT using a non-high frequency band, the user terminal 1 performs the preliminary determination operation.

Specifically, as shown in FIG. 18, the user terminal 1 first determines whether or not the source cell uses a RAT using a high frequency band (ST151). If the source cell uses a RAT using a high frequency band (Yes in ST151), the process proceeds to the control in which the user terminal 1 does not perform the preliminary determination operation (ST142). If the source cell uses a RAT using a non-high frequency band (No in ST151), the process proceeds to the control in which the user terminal 1 performs the preliminary determination operation (ST143).

In this way, in the second variation of the third embodiment, when the source cell uses a RAT using a high frequency band, the user terminal 1 does not perform the preliminary determination operation, and thus the Xn interface is released at earlier time, and when the source cell uses a RAT using a non-high frequency band, the user terminal 1 performs the preliminary determination operation, and thus the Xn interface is released at later time. This configuration ensures a handover is smoothly performed even under the environments in which intermittent communication breaks are likely to occur.

Third Variation of Third Embodiment

Figure 19:
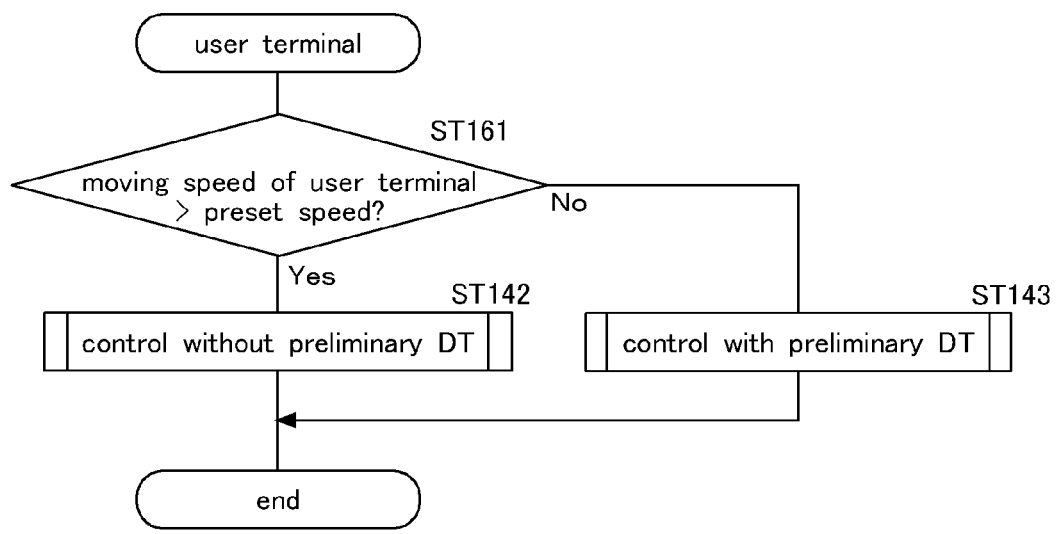
FIG. 19 is a flow chart showing an operation procedure of the user terminal 1 according to a third variation of the third embodiment of the present invention.

Next, a third variation of the third embodiment of the present invention will be described. Except for what will be discussed here, this embodiment is the same as the above-described embodiments. FIG. 19 is a flow chart showing an operation procedure of the user terminal 1 according to the third variation of the third embodiment of the present invention.

For example, in cases where a user of the user terminal 1 on a high-speed train and the user terminal 1 moves at a high speed (for example, 200 km/h or more), a period of time from when the reception power of the source cell (currently-connected cell) becomes less than the first threshold value ThLOW, to when the user terminal 1 moves out of the communication area of the source cell becomes short. This means that it is not possible to secure enough time to prepare for a handover to the handover. Thus, when the user terminal 1 moves at high speed, the user terminal 1 needs to start preparation for a handover at earlier time.

In this light, in the third variation of the third embodiment, the user terminal 1 is configured such that, if the user terminal 1 moves at a higher speed than a predetermined speed, the user terminal 1 does not perform the preliminary determination operation, and if the user terminal 1 moves at a speed which is not higher than the predetermined speed, the user terminal 1 performs the preliminary determination operation.

Specifically, as shown in FIG. 19, the user terminal 1 first acquires the moving speed of the user terminal 1 and determines whether or not the user terminal 1 moves at a higher speed than the predetermined speed (ST161). If the moving speed of the user terminal 1 is higher than the predetermined speed (Yes in ST161), the process proceeds to the control in which the user terminal 1 does not perform the preliminary determination operation (ST142). If the moving speed of the user terminal 1 is not higher than the predetermined speed (No in ST161), the process proceeds to the control in which the user terminal 1 performs the preliminary determination operation (ST143).

In this way, in the third variation of the third embodiment, when the user terminal 1 moves at high speed, the user terminal 1 does not perform the preliminary determination operation, and thus the user terminal 1 starts preparation for a handover at earlier time. This configuration can prevent failure to secure necessary time to perform a handover, thereby enabling a smooth handover to the target cell.

Fourth Variation of Third Embodiment

Next, a fourth variation of the third embodiment of the present invention will be described. Except for what will be discussed here, this embodiment is the same as the above-described embodiments. FIG. 20 is a flow chart showing an operation procedure of the user terminal 1 according to the fourth variation of the third embodiment of the present invention.

In some cases, the communication quality of the source cell (currently-connected cell) is sufficiently high while that of the target cell is also sufficiently high at the same time. In this case, it is preferable that the user terminal starts preparation for a handover at earlier time, and when the communication quality of the source cell is lowered, the user terminal 1 immediately starts preparation for a handover to the target cell.

In this light, in the fourth variation of the third embodiment, the user terminal 1 is configured such that, even when the reception power of the source cell is equal to or greater than the second threshold value ThHIGH, if the reception power of the target cell is also equal to or greater than the second threshold value ThHIGH, the user terminal 1 starts preparation for a handover, and transmits a measurement report message.

Specifically, as shown in FIG. 20, the user terminal 1, in the same manner as the third embodiment (see FIG. 16), first clears the handover destination candidate list in the storage 13 (ST101), measures the communication quality of neighboring cells (ST102), perform the preliminary determination operation (ST131), and then if the reception power P of the source cell is less than the second threshold value ThHIGH (No in ST131), the process proceeds to ST103.

If the reception power P of the source cell is equal to or greater than the second threshold value ThHIGH (Yes in ST131), then the user terminal 1 determines whether or not the reception power P of the target cell is equal to or greater than the second threshold value ThHIGH (ST171).

If the reception power P of the target cell is equal to or greater than the second threshold value ThHIGH (Yes in ST171), the process proceeds to ST103. If the reception power P of the target cell is less than the second threshold value ThHIGH (No in ST171), the user terminal 1 does not start preparation for a handover and the process returns to ST102.

The subsequent processing steps ST103 to ST108 are the same as those of the third embodiment (see FIG. 16). That is, as the reception power P of the target cell is equal to or greater than the second threshold value ThHIGH, the user terminal 1 transmits a measurement report message (Measurement Report) (ST104), and transmits a handover confirmation message (HO confirm) (ST108).

In this way, in the fourth variation of the third embodiment, even when the reception power of the source cell is equal to or greater than the second threshold value ThHIGH, if the reception power of the target cell is also equal to or greater than the second threshold value ThHIGH, the user terminal 1 starts preparation for a handover. Thus, when the reception power of the source cell becomes lower than the second threshold value ThHIGH, the user terminal 1 is allowed to immediately perform a handover to the target cell, thereby enabling the user terminal 1 to perform a handover in a quick manner depending on the transmission states.

While specific embodiments of the present invention are described herein for illustrative purposes, the present invention is not limited to the specific embodiments. It will be understood that various changes, substitutions, additions, and omissions may be made for elements of the embodiments without departing from the scope of the invention. In addition, elements and features of the different embodiments may be combined with each other as appropriate to yield an embodiment which is within the scope of the present invention.

INDUSTRIAL APPLICABILITY

A mobile terminal apparatus, a base station apparatus, and a communication system and a communication control method according to the present invention achieve an effect of preventing occurrence of the frequent transmission of messages even when a fast handover technology is used, and are useful as a mobile terminal apparatus configured to perform a handover for switching a connection destination from a base station apparatus of a source cell to a base station apparatus of a target cell, a base station apparatus configured such that a mobile terminal apparatus can switch a connection destination from the base station apparatus to a different base station apparatus by performing a handover, and a communication system and a communication control method for performing a handover for switching a connection destination of a mobile terminal apparatus from a base station apparatus of a source cell to a base station apparatus of a target cell.

Glossary 1 user terminal (mobile terminal apparatus)
2 base station (base station apparatus)
11 wireless communication device
12 controller
13 storage
21 wireless communication device (first communication device)
22 wired communication device (second communication device)
23 controller
24 storage

The invention claimed is:

1. A mobile terminal apparatus configured to perform a handover for switching a connection destination from a base station apparatus of a source cell to a base station apparatus of a target cell, the mobile terminal apparatus comprising:
a communication device configured to perform wireless communication with the base station apparatus of the source cell and the base station apparatus of the target cell; and
a controller configured such that, when a measurement of communication quality of the target cell is equal to or greater than a first threshold value, the controller starts preparation for a handover to the base station apparatus of the target cell, and when the measurement is equal to or greater than a second threshold value, the controller performs the handover,
wherein, until a waiting time has elapsed after performing the handover, the controller performs a timing control for maintaining an immediate handover state in which the controller can immediately perform a handover to the base station apparatus of the source cell, and wherein, when the waiting time has elapsed, the controller ends the immediate handover state and enters a normal handover state in which the controller requires preparation for a handover.

2. The mobile terminal apparatus according to claim 1, wherein the controller performs the timing control based on the waiting time, wherein the waiting time is preset.

3. The mobile terminal apparatus according to claim 1, wherein the controller performs the timing control based on the waiting time, wherein the waiting time is determined based on at least one of a moving speed of the mobile terminal apparatus, a moving direction of the mobile terminal apparatus, and a cell radius of the source cell.

4. A mobile terminal apparatus configured to perform a handover for switching a connection destination from a base station apparatus of a source cell to a base station apparatus of a target cell, the mobile terminal apparatus comprising:
a communication device configured to perform wireless communication with the base station apparatus of the source cell and the base station apparatus of the target cell; and
a controller configured such that, when a measurement of communication quality of the target cell is equal to or greater than a first threshold value, the controller starts preparation for a handover to the base station apparatus the target cell, and when the measurement is equal to or greater than a second threshold value, the controller performs the handover,
wherein, until a prescribed event regarding communication quality of the source cell occurs after performing the handover, the controller performs a timing control for maintaining an immediate handover state in which the controller can immediately perform a handover to the base station apparatus of the source cell, and wherein, when the prescribed event occurs, the controller ends the immediate handover state, enters a normal handover state in which the controller requires preparation for a handover, and transmits a message from the communication device to the base station apparatus of the target cell to which the mobile terminal apparatus is currently connected, the message instructing to release an inter-base-station interface.

5. The mobile terminal apparatus according to claim 4, wherein the controller determines that the prescribed event has occurred when the measurement of communication quality of the source cell is equal to or less than a third threshold value.

6. The mobile terminal apparatus according to claim 5, wherein the controller determines whether or not the prescribed event has occurred based on the third threshold value, wherein the third threshold value is less than the first threshold value.

7. The mobile terminal apparatus according to claim 4, wherein the controller determines that the prescribed event has occurred when the mobile terminal apparatus becomes unable to receive a radio wave from the source cell.

8. The mobile terminal apparatus according to claim 1, wherein, when the target cell has a lower priority than or same priority as the source cell, the controller performs the timing control, and when the target cell has a higher priority than the source cell, the controller does not perform the timing control.

9. A mobile terminal apparatus configured to perform a handover for switching a connection destination from a base station apparatus of a source cell to a base station apparatus of a target cell, the mobile terminal apparatus comprising:

a communication device configured to perform wireless communication with the base station apparatus of the source cell and the base station apparatus of the target cell; and a controller configured such that, when a measurement of communication quality of the target cell is equal to or greater than a first threshold value, the controller can start preparation for a handover to the base station apparatus of the target cell, and when the measurement is equal to or greater than a second threshold value, the controller performs the handover, wherein the controller is configured to perform a preliminary determination operation on whether or not a measurement of communication quality of the source cell is equal to or greater than the second threshold value, and wherein, when the measurement of communication quality of the source cell is equal to or greater than the second threshold value, even when the measurement of communication quality of the target cell is equal to or greater than the first threshold value, the controller does not start preparation for the handover to the base station apparatus of the target cell.

10. The mobile terminal apparatus according to claim 9, wherein, when the source cell has a higher priority than the target cell, the controller performs the timing control, and when the source cell has a lower priority than or same priority as the target cell, the controller does not perform the preliminary determination operation.

11. The mobile terminal apparatus according to claim 9, wherein, when the source cell does not use a high frequency band radio access technology, the controller performs the preliminary determination operation, otherwise the controller does not perform the preliminary determination operation.

12. The mobile terminal apparatus according to claim 9, wherein, when the mobile terminal apparatus travels at a speed lower than a predetermined speed, the controller performs the preliminary determination operation, otherwise the controller does not perform the preliminary determination operation.

13. The mobile terminal apparatus according to claim 9, wherein, even when the measurement of communication quality of the source cell is greater than the second threshold value, when the measurement of communication quality of the target cell is equal to or greater than the second threshold value, the controller can start preparation for the handover to the base station apparatus of the target cell.

14. A base station apparatus configured such that a mobile terminal apparatus can switch a connection destination from the base station apparatus to a different base station apparatus by performing a handover, the base station apparatus comprising:

a first communication device configured to perform wireless communication with the mobile terminal apparatus;

a second communication device configured to perform wireless communication with the different base station apparatus; and a controller configured such that, when the mobile terminal apparatus performs a handover to the base station apparatus as a target cell, the controller causes an inter-base-station interface to be established between the base station apparatus and the different base station apparatus as a source cell and controls the handover performed by the mobile terminal apparatus, wherein, until a prescribed event regarding communication quality of the source cell occurs after the mobile terminal apparatus performing the handover, the controller performs a timing control for suspending the inter-base-station interface from being released, and wherein, when the first communication device receives a message instructing to release the inter-base-station interface, the controller causes the inter-base-station interface to be released.

15. The base station apparatus according to claim 14, wherein, immediately after the mobile terminal apparatus performing the handover, the controller transmits a message from the second communication to the different base station apparatus of the source cell, the message instructing the different base station apparatus to stop performing a processing operation regarding a wireless communication control.

16. A communication control method for performing a handover for switching a connection destination of a mobile terminal apparatus from a base station apparatus of a source cell to one in a base station apparatus of a target cell, wherein the mobile terminal apparatus performs a fast handover control in which, when a measurement of communication quality of the target cell is equal to or greater than a first threshold value, the mobile terminal apparatus starts preparation for a handover to the target cell, and when the measurement is equal to or greater than a second threshold value, the mobile terminal apparatus performs the handover to the target cell, wherein, until a waiting time has elapsed after performing the handover to the target cell, the mobile terminal apparatus performs a timing control for maintaining an immediate handover state in which the mobile terminal apparatus can immediately perform a handover to the base station apparatus of the source cell, and wherein, when the waiting time has elapsed, the mobile terminal apparatus ends the immediate handover state and enters a normal handover state in which the mobile terminal apparatus requires preparation for a handover, wherein, when the mobile terminal apparatus performs the handover, the base station apparatus of the target cell causes an inter-base-station interface to be established between the base station apparatus and the different base station apparatus of the source cell and controls the handover performed by the mobile terminal apparatus, wherein, until a waiting time has elapsed after the mobile terminal apparatus performing the handover, the base station apparatus of the target cell performs a timing control for suspending the inter-base-station interface from being released, and wherein, when the waiting time has elapsed, the base station apparatus of the target cell causes the inter-base-station interface to be released.

17. A communication control method for performing a handover for switching a connection destination of a mobile terminal apparatus from a base station apparatus of a source cell to one in a base station apparatus of a target cell, wherein the mobile terminal apparatus performs a fast handover control in which, when a measurement of communication quality of the target cell is equal to or greater than a first threshold value, the mobile terminal apparatus starts preparation for a handover to the target cell, and when the measurement is equal to or greater than a second threshold value, the mobile terminal apparatus performs the handover to the target cell, wherein, until a prescribed event regarding communication quality of the source cell occurs after performing the handover to the target cell, the mobile terminal apparatus performs a timing control for maintaining an immediate handover state in which the mobile terminal apparatus can immediately perform a handover to the base station apparatus of the source cell, and wherein, when the prescribed event occurs, the mobile terminal apparatus ends the immediate handover state, enters a normal handover state in which the mobile terminal apparatus requires preparation for a handover, and transmits a message from the communication device to the base station apparatus of the target cell to which the mobile terminal apparatus is currently connected, the message instructing to release an inter-base-station interface, wherein, when the mobile terminal apparatus performs the handover, the base station apparatus of the target cell causes an inter-base-station interface to be established between the base station apparatus and the different base station apparatus of the source cell and controls the handover performed by the mobile terminal apparatus, wherein, until the prescribed event occurs after the mobile terminal apparatus performing the handover, the base station apparatus of the target cell performs a timing control for suspending the inter-base-station interface from being released, and wherein, when receiving a message from the mobile terminal apparatus, the message instructing to release the inter-base-station interface, the base station apparatus of the target cell causes the inter-base-station interface to be released.

18. A communication control method for performing a handover for switching a connection destination of a mobile terminal apparatus from a base station apparatus of a source cell to one in a base station apparatus of a target cell, wherein the mobile terminal apparatus performs a fast handover control in which, when a measurement of communication quality of the target cell is equal to or greater than a first threshold value, the mobile terminal apparatus can start preparation for a handover to the target cell, and when the measurement is equal to or greater than a second threshold value, the mobile terminal apparatus performs the handover to the target cell, and wherein, when performing the fast handover, the mobile terminal apparatus performs a preliminary determination operation on whether or not a measurement of communication quality of the source cell is equal to or greater than the second threshold value, and wherein, when the measurement of communication quality of the source cell is equal to or greater than the second threshold value, even when the measurement of communication quality of the target cell is equal to or greater than the first threshold value, the mobile terminal apparatus does not start preparation for a handover to the base station apparatus of the target cell.

* * * * *